(12) United States Patent
Morris

(10) Patent No.: US 11,516,226 B2
(45) Date of Patent: *Nov. 29, 2022

(54) CONTEXTUAL ANALYSES OF NETWORK TRAFFIC

(71) Applicant: GreyNoise Intelligence Inc., Washington, DC (US)

(72) Inventor: Andrew Kevin Morris, Washington, DC (US)

(73) Assignee: GreyNoise Intelligence Inc., Washington, DC (US)

(*) Notice: Subject to any disclaimer, the term of this patent is extended or adjusted under 35 U.S.C. 154(b) by 319 days.

This patent is subject to a terminal disclaimer.

(21) Appl. No.: 17/035,033

(22) Filed: Sep. 28, 2020

(65) Prior Publication Data

US 2021/0029139 A1 Jan. 28, 2021

Related U.S. Application Data

(63) Continuation of application No. 16/936,288, filed on Jul. 22, 2020, now Pat. No. 10,819,716, which is a continuation of application No. 16/878,023, filed on May 19, 2020, now Pat. No. 10,757,117, which is a continuation-in-part of application No. 16/672,394, filed on Nov. 1, 2019, now Pat. No. 10,659,335.

(Continued)

(51) Int. Cl.
*H04L 29/06* (2006.01)
*H04L 9/40* (2022.01)

(52) U.S. Cl.
CPC ................. *H04L 63/1408* (2013.01)

(58) Field of Classification Search
CPC .. H04L 63/1408; H04L 43/026; H04L 43/028
See application file for complete search history.

(56) References Cited

U.S. PATENT DOCUMENTS 6,484,203 B1 11/2002 Porras et al.
8,806,550 B1 8/2014 Chan
(Continued)

OTHER PUBLICATIONS

Morris, Andrew, "The Background Noise of the Internet", https://www.slideshare.net/andrewwantsyou/the-background-noise-of-the-internet, published on Jan. 28, 2018, 85 pages.

(Continued)

*Primary Examiner* — William J. Goodchild
*Assistant Examiner* — William A Corum, Jr.
(74) *Attorney, Agent, or Firm* — Bayes PLLC

(57) ABSTRACT

Systems and methods for analyzing network traffic are provided. An exemplary system may include a plurality of network nodes distributed in multiple geographical regions. The plurality of network nodes may be configured to collect mass scanning network traffic data. The system may also include at least one processor. The processor may be configured to receive, from a first network node, a first network scanning request from a source scanner. In response to the reception of the first network scanning request, the processor may also be configured to transmit, via a second network node, a second network scanning request to the source scanner. The processor may further be configured to determine, based on feedback from the source scanner, whether the source scanner is compromised.

18 Claims, 10 Drawing Sheets

Related U.S. Application Data

(60) Provisional application No. 62/842,854, filed on May 3, 2019.

(56) References Cited

U.S. PATENT DOCUMENTS

| | | | |
|---|---|---|---|
| 8,898,783 | B2 | 11/2014 | Chung et al. |
| 9,916,462 | B1 | 3/2018 | Edwards |
| 2002/0032774 | A1 | 3/2002 | Kohler, Jr. et al. |
| 2002/0087408 | A1 | 7/2002 | Burnett |
| 2006/0137012 | A1 | 6/2006 | Aaron |
| 2007/0162965 | A1 | 7/2007 | Carter et al. |
| 2008/0072289 | A1 | 3/2008 | Aoki et al. |
| 2012/0311704 | A1 | 12/2012 | Reilly |
| 2015/0326589 | A1 | 11/2015 | Smith |
| 2017/0250995 | A1* | 8/2017 | Langton .............. H04L 63/1408 |
| 2018/0367551 | A1 | 12/2018 | Muddu et al. |
| 2019/0036963 | A1* | 1/2019 | Ahad ...................... H04L 43/04 |
| 2019/0058725 | A1 | 2/2019 | Kraning et al. |
| 2020/0280577 | A1 | 9/2020 | Segal et al. |
| 2020/0287920 | A1* | 9/2020 | Mandrychenko ... H04L 67/5651 |
| 2021/0377295 | A1* | 12/2021 | Alfraih .................. H04L 41/16 |

OTHER PUBLICATIONS

Morris, Andrew, "Identifying and Correlating Internet-wide Scan Traffic to Newsworthy Security Events", https://vww.slideshare.net/andrewwantsyou/identifying-and-correlating-internetwide-scan-traffic-to-newsworthy-security-events, published on Aug. 23, 2018, 44 pages.

Morris, Andrew, "Using GreyNoise to Quantify Response Time of Cloud Provider Abuse Teams", https://www.slideshare.net/andrewwantsyou/using-greynoise-to-quantify-response-time-of-cloud-provider-abuse-teams, published on Feb. 4, 2019, 42 pages.

\* cited by examiner

CONTEXTUAL ANALYSES OF NETWORK TRAFFIC

CROSS-REFERENCE TO RELATED APPLICATIONS

This application is a continuation of U.S. patent application Ser. No. 16/936,288, filed Jul. 22, 2020, which is a continuation of U.S. patent application Ser. No. 16/878,023, filed May 19, 2020 (now U.S. Pat. No. 10,757,117), which is a continuation-in-part (CIP) of U.S. patent application Ser. No. 16/672,394, filed Nov. 1, 2019 (now U.S. Pat. No. 10,659,335), which claims the benefits of priority to Provisional Application No. 62/842,854, filed May 3, 2019. The entire contents of each of the above-identified applications are expressly incorporated herein by reference.

TECHNICAL FIELD

The present disclosure relates to network traffic analyses, and more particularly, to systems and methods for performing contextual analyses of network traffic to differentiate between targeted and omnidirectional network traffic, thereby reducing false alarms.

BACKGROUND

The advance of network technology and the availability of open source tools such as Masscan, ZMap, UnicornScan, etc. make Internet-wide mass scanning relatively easy to implement. In addition, different organizations routinely scan the Internet for various purposes. These lead to an overwhelming amount of unsolicited, omnidirectional network traffic on the Internet, effectively forming a "background noise" of the Internet traffic.

The background noise creates a large amount of false alarms to network security analysts, who often waste many hours reviewing the false alarms. Due to the natural of the omnidirectional mass scanning, alarms stemmed from the background noise are much less significant than, for example, those stemmed from targeted scans aiming specifically to a particular organization. However, current systems are unable to reliably differentiate between targeted and omnidirectional network traffic.

SUMMARY

In one example, a system for analyzing network traffic may include a plurality of network nodes distributed in multiple geographical regions. The plurality of network nodes may be configured to collect mass scanning network traffic data. The system may also include at least one processor. The processor may be configured to receive, from the plurality of network nodes, the collected mass scanning network traffic data. The processor may also be configured to generate an omnidirectional network traffic database based on the received mass scanning network traffic data. The processor may further be configured to receive a query against the omnidirectional network traffic database. The query may include information of a source of a network scanning activity. Moreover, the processor may be configured to determine whether the source matches any record in the omnidirectional network traffic database and generate an indication based on the determination.

In another example, a method for analyzing network traffic may include receiving, from a plurality of network nodes distributed in multiple geographical regions, mass scanning network traffic data collected by the plurality of network nodes. The method may also include generating an omnidirectional network traffic database based on the received mass scanning network traffic data. The method may further include receiving a query against the omnidirectional network traffic database. The query may include information of a source of a network scanning activity. Moreover, the method may include determining whether the source matches any record in the omnidirectional network traffic database and generating an indication based on the determination.

In a further example, a non-transitory computer-readable medium may store instructions that, when executed by at least one processor, cause the at least one processor to perform a method for analyzing network traffic. The method may include receiving, from a plurality of network nodes distributed in multiple geographical regions, mass scanning network traffic data collected by the plurality of network nodes. The method may also include generating an omnidirectional network traffic database based on the received mass scanning network traffic data. The method may further include receiving a query against the omnidirectional network traffic database. The query may include information of a source of a network scanning activity. Moreover, the method may include determining whether the source matches any record in the omnidirectional network traffic database and generating an indication based on the determination.

In another example, a system for analyzing network traffic may include a memory storing computer-readable instructions and at least one processor in communication with the memory. The computer-readable instructions, when executed by the at least one processor, may cause the at least one processor to perform operations. The operations may include receiving, from a plurality of network listeners, network traffic data. The operations may also include aggregating the network traffic data to generate a database of mass scanning network traffic. The database may associate the mass scanning network traffic with respective sources of the mass scanning network traffic. The operations may further include querying the database with a first source associated with first network traffic. In addition, the operations may include determining whether at least one source in the database matches the first source.

In a further example, a method for analyzing network traffic may include receiving, from a plurality of network listeners, network traffic data. The method may also include aggregating the network traffic data to generate a database of mass scanning network traffic. The database may associate the mass scanning network traffic with respective sources of the mass scanning network traffic. The method may further include querying the database with a first source associated with first network traffic. In addition, the method may include determining whether at least one source in the database matches the first source.

In yet another example, a non-transitory computer-readable medium may store instructions that, when executed by at least one processor, cause the at least one processor to perform a method for analyzing network traffic. The method may include receiving, from a plurality of network listeners, network traffic data. The method may also include aggregating the network traffic data to generate a database of mass scanning network traffic. The database may associate the mass scanning network traffic with respective sources of the mass scanning network traffic. The method may further include querying the database with a first source associated with first network traffic. In addition, the method may include determining whether at least one source in the database matches the first source.

In yet another example, a system for analyzing network traffic may include a plurality of network nodes distributed in multiple geographical regions. The plurality of network nodes may be configured to collect mass scanning network traffic data. The system may also include at least one processor. The processor may be configured to receive, from a first network node, a first network scanning request from a source scanner. In response to the reception of the first network scanning request, the processor may also be configured to transmit, via a second network node, a second network scanning request to the source scanner. The processor may further be configured to determine, based on feedback from the source scanner, whether the source scanner is compromised.

In yet another example, a method for analyzing network traffic may include receiving, from a first network node, a first network scanning request from a source scanner. In response to the reception of the first network scanning request, the method may also include transmitting, via a second network node, a second network scanning request to the source scanner. The method may further include determining, based on feedback from the source scanner, whether the source scanner is compromised.

In yet another example, a non-transitory computer-readable medium may store instructions that, when executed by at least one processor, cause the at least one processor to perform a method for analyzing network traffic. The method may include receiving, from a first network node, a first network scanning request from a source scanner. In response to the reception of the first network scanning request, the method may include transmitting, via a second network node, a second network scanning request to the source scanner. The method may also include determining, based on feedback from the source scanner, whether the source scanner is compromised.

In yet another example, a system for analyzing network traffic may include a memory storing computer-readable instructions and at least one processor in communication with the memory. The computer-readable instructions, when executed by the at least one processor, may cause the at least one processor to perform operations. The operations may include receiving, via a first network node, a first network inquiry. The operations may also include determining, based on the first network inquiry, a group of candidate responses. The group of candidate responses may be selected from a database storing network-wide historical responses to the first network inquiry. The operations may also include selecting a first response from the group of candidate responses. The operations may further include responding to the first network inquiry with the first response via the first network node.

In yet another example, a method for analyzing network traffic may include receiving, via a first network node, a first network inquiry. The method may also include determining, based on the first network inquiry, a group of candidate responses. The group of candidate responses may be selected from a database storing network-wide historical responses to the first network inquiry. The method may further include selecting a first response from the group of candidate responses. Moreover, the method may include responding to the first network inquiry with the first response via the first network node.

In yet another example, a non-transitory computer-readable medium may store instructions that, when executed by at least one processor, cause the at least one processor to perform a method for analyzing network traffic. The method may include receiving, via a first network node, a first network inquiry. The method may also include determining, based on the first network inquiry, a group of candidate responses. The group of candidate responses may be selected from a database storing network-wide historical responses to the first network inquiry. The method may further include selecting a first response from the group of candidate responses. Moreover, the method may include responding to the first network inquiry with the first response via the first network node.

In yet another example, a system for analyzing network traffic may include a memory storing computer-readable instructions and at least one processor in communication with the memory. The computer-readable instructions, when executed by the at least one processor, may cause the at least one processor to perform operations. The operations may include receiving, from a first network node, a first notification indicating reception of a first request sent by an unsolicited requester for network connection with the first network node. The operations may also include instructing the first network node to respond to the first request with a first response. The operation may also include receiving, from a second network node, a second notification indicating reception of a second request sent by the unsolicited requester for network connection with the second network node. The operations may further include instructing the second network node to respond to the second request with a second response that is different from the first response.

In yet another example, a method for analyzing network traffic may include receiving, from a first network node, a first notification indicating reception of a first request sent by an unsolicited requester for network connection with the first network node. The method may also include instructing the first network node to respond to the first request with a first response. The method may also include receiving, from a second network node, a second notification indicating reception of a second request sent by the unsolicited requester for network connection with the second network node. The method may further include instructing the second network node to respond to the second request with a second response that is different from the first response.

In yet another example, a non-transitory computer-readable medium may store instructions that, when executed by at least one processor, cause the at least one processor to perform a method for analyzing network traffic. The method may include receiving, from a first network node, a first notification indicating reception of a first request sent by an unsolicited requester for network connection with the first network node. The method may also include instructing the first network node to respond to the first request with a first response. The method may also include receiving, from a second network node, a second notification indicating reception of a second request sent by the unsolicited requester for network connection with the second network node. The method may further include instructing the second network node to respond to the second request with a second response that is different from the first response.

DETAILED DESCRIPTION

Figure 1:
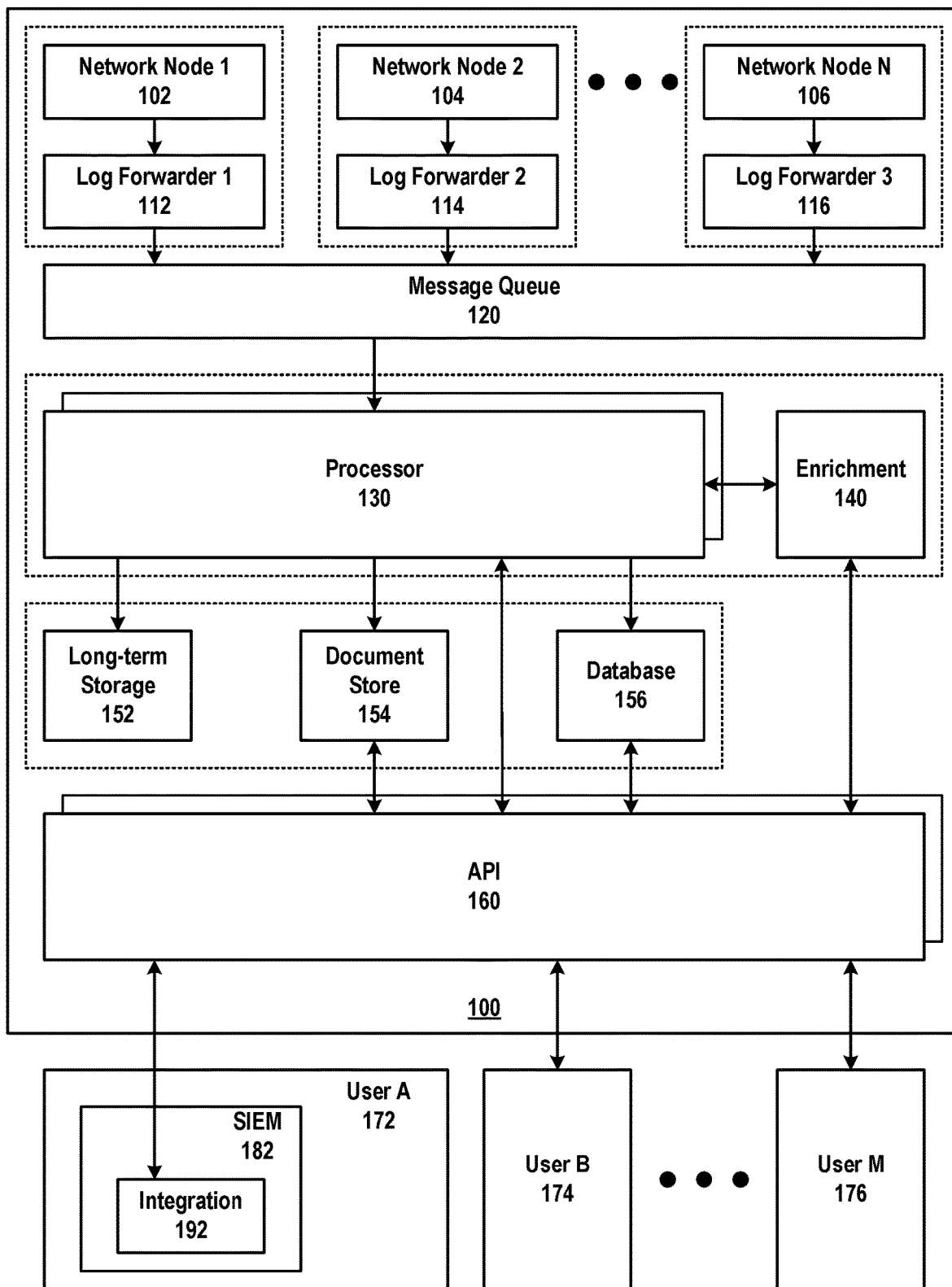
FIG. 1 illustrates an exemplary system for analyzing network traffic, according to embodiments of the disclosure.

Computers, devices, and machines connected to the Internet are often exposed to a constant barrage of "opportunistic" scan, attack, and web crawler traffic (collectively referred to as mass scanning network traffic, scanning network traffic, network scanning traffic, or scanning traffic). Some of the scanning traffic may be benign, such as those conducted by search engines (e.g., Google, Bing, Yahoo, Yandex, Baidu, etc.) and security researches (e.g., Shodan, Censys, ShadowServer, Project Sonar, etc.). Some may be malicious, such as those indiscriminate worms (e.g., Mirai, WannaCry, etc.). All these mass scanning network traffic, however, are not targeted to specific organizations, computers, or machines. Instead, the mass scanning network traffic are omnidirectional (e.g., toward the whole IPv4 space) and often span across the whole Internet, effectively forming a "background noise" of the Internet traffic. As a result, a single IP address (e.g., assigned to a computer) in the IPv4 space can receive unsolicited traffic from tens of thousands of unique IP addresses on a daily basis. As used herein, these background noise-type of mass scanning network traffic may also be referred to as omnidirectional network traffic.

Because these background noise-type of scanning traffic are omnidirectional without specific targets, they are generally less significant in terms of security risks to a particular organization than, for example, those scanning traffic targeting that particular organization. However, from the organization's point of view, it is difficult to distinguish between omnidirectional (e.g., background noise-type) and targeted scanning traffic, because both kinds of scanning traffic may exhibit similar behaviors. Therefore, the background noise-type of scanning traffic can also trigger security alerts, similar to the targeted scanning traffic, although most of the security alarms triggered by the background noise-type of scanning traffic are false positives. Security analysts may waste hours reviewing these insignificant security alerts triggered by these omnidirectional background noise-type of scanning traffic.

Embodiments of the present disclosure provide systems and methods for analyzing network traffic. Exemplary systems and methods can improve the efficiency of managing network security alerts by identifying background noise-type of scanning traffic and deprioritizing those security alerts triggered by such scanning traffic. For example, a network traffic analysis system can be implemented by collecting the omnidirectional, Internet-wide network scanning traffic from a world-wide network of sensors (e.g., a plurality of specifically configured network nodes) functioning as network traffic listeners to receive and log mass scanning network traffic data. The collected mass scanning network traffic data can then be used to generate an omnidirectional network traffic database, which can be used as a filter to filter out all of the omnidirectional network traffic within any give set of network traffic data. The remaining network traffic are most likely targeted traffic. In this way, omnidirectional mass scanning network traffic can be removed from or deprioritized within the network traffic "field of view" observed by of an organization, thereby allowing security analysts to refocus their attention to security alerts triggered by the targeted network traffic. In addition, records within the omnidirectional network traffic database can be enriched to provide contextual information, such as historical information, trending information, forecasting information, etc. Such contextual information may help security analysts to gain additional knowledge about the identified or filtered omnidirectional network traffic.

In this disclosure, the terms "mass scanning," "omnidirectional," "non-discriminative," and "opportunistic" are used interchangeably, all referring to the common property of background noise-type of network traffic, events, activities, requests, inquires, etc. On the other hand, the terms "targeted" and "directional" are used interchangeably to refer to the common property of those network traffic, events, activities, requests, or inquires that are specifically directed to, targeted at, or limited to an organization, a group of organizations, a geographical localized region, a logical collection of network devices, or any subset of the Internet that is distinctively treated relative to the rest of the Internet. As used herein, an "organization" may own, administer, and/or control one or more computers, devices, or machines that are connected to the Internet. For example, an organization may include one or more individuals, one or more companies, one or more governmental bodies, or the like. In some cases, regardless of the actual composition of an organization, the term "organization" may be used to simply refer to a set of network-connected computers, devices, or machines.

FIG. 1 illustrate an exemplary system 100 for analyzing network traffic, according to embodiments of the disclosure. As shown in FIG. 1, system 100 may include a plurality of (e.g., N>1) network nodes (also referred to as collector nodes or collectors), such as network nodes 102, 104, and 106. In some embodiments, the plurality of network nodes may be located in or hosted by private computer devices, such as private servers controlled by users and/or customers. In some embodiments, the plurality of network nodes may be located in datacenters of one or more cloud computing service providers (e.g., Amazon Web Services (AWS), DigitalOcean, Linode, Vultr, Google Cloud, Microsoft Azure, etc.). For example, an exemplary network node (e.g., 102) may be in the form of a virtual computer, a server, a network/web service, or the like, that is hosted by one or more private computer device(s) and/or cloud computing service provider(s). From the point of view of an outside observer (e.g., another network device connected to the Internet), the network node may be perceived (e.g., through network interactions) as an ordinary network device (e.g., a web server) that exhibits normal behaviors commensurate with such kind of devices.

The plurality of network nodes (e.g., 102, 104, 106) may be distributed in multiple geographical regions. For example, within a cloud computing service, network nodes may be deployed in datacenters around the world, such as in multiple continents, multiple countries, and/or multiple parts of a country. Take Google Cloud service for example, its cloud platform services are available in locations across North America, South America, Europe, Asia, and Australia. These locations are further divided into regions and zones, where one region may include multiple zones. Network nodes may be deployed in multiple regions/zones, depending on the desired deployment density. In some regions/zones, a single network node may be deployed. In other regions/zones, multiple network nodes may be deployed. In some embodiments, network nodes may be deployed in each of the regions/zones. The network nodes may also be deployed in randomly selected zones within a region. In another example, distribution of network nodes within a geographical region may be implemented through deploying network nodes using multiple cloud computing service providers. For instance, coverage of North America may be achieved by deploying network nodes in the North America area across multiple cloud computing service providers. Take FIG. 1 for example, both network nodes 102 and 104 may be located in North America, while network node 102 may be deployed using Google Cloud service and network node 104 may be deployed using AWS. In another example, both network nodes 102 and 104 may be Google Cloud servers, while network node 102 may be in Asia and network node 104 may be in Europe.

The network nodes may be configured as network sensors to sense mass scanning network traffic by collecting scanning traffic data. In some embodiments, one or more of the network nodes may be equipped with a certain amount of computational resources (e.g., CPU, memory, storage, etc.) and a communication interface so as to receive and process information, such as mass scanning network traffic, from the Internet. For example, the network nodes may function as passive "listeners" without actively offering services having actual business significance. Their identities are not advertised or otherwise known to a third-party scanner. For instance, the network nodes may be configured to block outgoing information flows such that their identification information (e.g., IP addresses) are not broadcast to the Internet or other third-party scanners. In other words, they may act as invisible, hidden observers of the network traffic on the Internet. Therefore, network traffic hitting these passive listeners are most likely, if not guaranteed, opportunistic, omnidirectional, and/or non-discriminative mass scanning traffic. Each of these network nodes may have an IP address of its own and may act as a dummy server with one or more network ports open to receive scanning inquiries. The network nodes may be configured to log all the network traffic that they receive, thereby collectively forming a global or Internet-wide system of collecting omnidirectional network traffic that are non-discriminatively broadcast to the whole Internet.

In some embodiments, the plurality of network nodes (e.g., 102, 104, 106) may send the collected mass scanning network traffic data to a server or a processor for processing. For example, FIG. 1 shows a processor 130 (also referred to as an ops box) that is configured to process the mass scanning network traffic data collected by one or more network nodes. In some embodiments, multiple processors may be used to process the collected scanning data. The processor(s) may be arranged in either a centralized or distributed manner. In some embodiments, the processor(s) may reside in one or more servers. The server(s) may include physical server(s), virtual server(s), or a combination thereof. For simplicity, the various configurations of processor(s) and/or server(s) are collectively represented by processor 130.

In some embodiments, a network node (e.g., 102) may send the collected mass scanning network traffic data to processor 130 using a log forwarder 112, as shown in FIG. 1. Log forwarder 112 may be implemented as a stand-alone service or as an integrated component of network node 102. Log forwarder 112 may monitor a local storage (e.g., a file folder) of network node 102 used for receiving and logging the mass scanning traffic data. After a new entry is logged, log forwarder 112 may be triggered (e.g., via an interrupt-triggering mechanism) to forward the new entry into a message queue 120 (also referred to as queue 120), as shown in FIG. 1. This log forwarding process may also be referred to as streaming, indicating that data collected by network node 102 are constantly streamed to message queue 120. Data collected by one or more other network nodes (e.g., 104, 106) may be forwarded to message queue 120 in a similar manner using their respective log forwarders (e.g., 114, 116).

Message queue 120 may be configured to handle information transmission from the network nodes (e.g., 102, 104, and 106) to processor 130. For example, the information transmission may be implemented using a publish-subscribe mechanism. Processor 130 may subscribe to message queue 120 and receive publications (e.g., new scanning traffic entries logged by the network nodes and forwarded by the respective log forwarders) from message queue 120, thereby funneling the scanning traffic data collected by the network nodes distributed worldwide and relayed through message queue 120.

System 100 may also include or connect to one or more databases, such as a long-term storage database 152, an omnidirectional network traffic database 156, and a document store 154, as shown in FIG. 1. These databases may collectively be referred to as a database system that may form part of system 100 or communicatively connected with system 100. Long-term storage database 152 may be configured to archive log data (e.g., scanning traffic data) received by processor 130, which may save a copy of the received log data in long-term storage database 152. Document store 154 may be configured to store document data related to mass scanning, knowledge base (e.g., known scanners), and/or other information gained from the processed log data or obtained from other sources. Database 156 may be configured to store processed log data, including source information extracted by processor 130. Data stored in database 156 may include source information of those "noise generators" that generate the entire spectrum of the Internet background noise. Therefore, database 156 may be used as a filter to filter out all of the omnidirectional traffic data from any given set of network traffic data. What is left after the filtering would most likely be targeted network traffic that are specifically directed to a particular subset of the Internet (e.g., an organization) rather than the entire Internet space.

System 100 may also include an enrichment service 140 configured to provide contextual information related to the scanning traffic data. Enrichment service 140 may be a stand-alone service or an integrated part of processor 130. Enrichment service 140 may tag or label data entries with rich contextual information, such as the geographical data, organizational data, DNS data, Tor status, data center data, category information, etc. Enrichment service 140 may generate the contextual information based on information extracted by processor 130 during the processing of the scanning traffic data received from queue 120. For example, geographical data and organizational data can be determined based on the IP address of a scanner using GeoIP data. The enrichment process may be performed as integrated operations when processor 130 processes the scanning traffic data, or as add-on operations after the scanning traffic data are processed by processor 130 to enhance the processed data. In some embodiments, the enriched data may be stored in database 156. In some embodiments, enrichment service 140 may be configured as an on-demand service to provide enrichment when called upon.

System 100 may also include a set of Application Programming Interface (API) servers 160 to provide the information stored in the databases (e.g., 154, 156) as well as the contextual information generated by enrichment service 140 to users (also referred to as customers). As shown in FIG. 1, a plurality of users (e.g., 172, 174, 176) may access information stored in document store 154 and/or database 156 through API 160. The users may include individuals, organizations, or a group of organizations having computers, devices, or machines that are connected and therefore exposed to the Internet. In some embodiments, a user may access the Internet background noise filter provided by system 100 using user-side integrations. Take user 172 for example, a user integration module 192 may be used to connect a Security Information and Event Management (STEM) system 182 of user 172 to system 100 via API servers 160. User integration module 192 may be implemented as a software plug-in running in STEM system 182 of user 172 to provide seamless integration. Similar integrations can also be implemented to other users (e.g., 174, 176).

Figure 2:
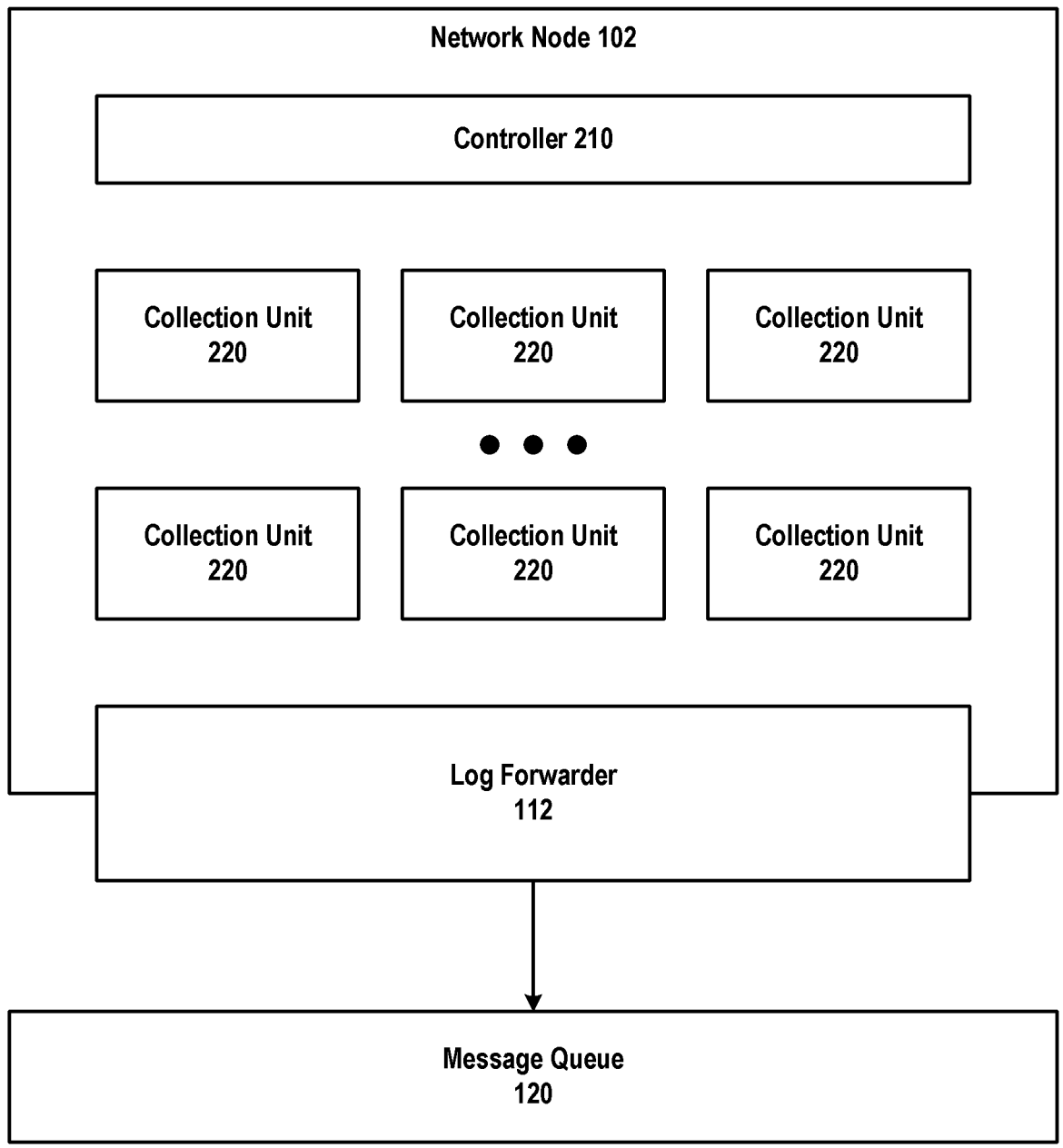
FIG. 2 illustrates an exemplary network node for collecting network scanning traffic data, according to embodiments of the disclosure.

FIG. 2 shows an exemplary implementation of network node 102 for collecting network scanning traffic data, according to embodiments of the disclosure. Referring to FIG. 2, network node 102 may include a controller 210 (also referred to as management module, supervisor module, or controller module) and a plurality of collection units 220 (also referred to as collection services). Each collection unit 220 may be configured to receive and log one or more types of mass scanning network traffic data such as iptables, http inquiries, telnet requests, etc. For example, each collection unit 220 may be configured to receive a particular type of mass scanning network traffic data according to a network protocol (e.g., Telnet, HTTP, TCP, UDP, SSH, etc.) In another example, there may be multiple collection units configured to receive one particular type of mass scanning network traffic data. In yet another example, a single collection unit may be configured to receive multiple types of mass scanning network traffic data.

In some embodiments, network node 102 may store the mass scanning network traffic data locally, for example, under a file folder or any suitable storage location. For example, a new entry may be recorded (e.g., stored) in the file folder or storage location after collection unit 220 receives a new scanning traffic request/inquiry. Log forwarder 112 may monitor the file folder or storage location for new entries. After a new entry is recorded, log forwarder 112 may be triggered (e.g., by an interrupt associated with the recordation of the new entry) to forward the new entry to message queue 120. As shown in FIG. 2, log forwarder 112 is depicted as partially overlapping with network node 102, indicating that log forwarder 112 may or may not be an integrated component of network node 102. In some embodiments, log forwarder 112 may be implemented as a stand-alone service module interfacing with network node 102 to perform log forwarding functions.

In some embodiments, network node 102 may be configured to receive network scanning traffic data via one or more network ports. For example, the network ports may be identified by numbers, ranging from 0 to 65535. Some of the ports are conventionally used for specific protocols, such as 80 for HTTP, 23 for Telnet, etc. Network node 102 may be configured to set one or more network ports open to receive network scanning traffic. After a network scanning request is received at a network port, information associated with the request may be logged by, for example, one of the collection units 220, in a local directory (e.g., a file folder), as described above.

Network node 102 may be configured in such a way that it is difficult to be fingerprinted. For example, network node 102 may be configured to simulate a regular networked computer or machine. In some embodiments, network node 102 may be configured to act like a regular web server that respond to scanning requests with typical responses a web server would do. In addition, network nodes in system 100 may be dynamically deployed and destroyed. Their network addresses may be constantly changing to reduce the likelihood of being fingerprinted.

As describe above, the network scanning traffic data logged by network node 102 may be sent to processor 130 by log forwarder 112. In some embodiments, log forwarder 112 may be configured to send the logged network scanning traffic data to message queue 120 as part of the mass scanning network traffic data to be received by processor 130 (e.g., in aggregation from multiple network nodes). For example, log forwarder 112 may act as a watcher to monitor the local directory that stores the logged network scanning traffic data. When a new entry is recorded in the local directory, an interrupt may be generated, which in turn may trigger log forwarder 112 to forward the new entry to message queue 120. In some embodiments, the forwarding of the logged content may be conducted in real time. Message queue 120 may be implemented using any suitable software tools, such as RabbitMQ. Processor 130, which may act as a consumer of the messages carried by message queue 120, may subscribe to message queue 120 to receive the mass scanning network traffic data (e.g., in the form of messages). Processor 130 may process the messages, parse the information contained in the messages, and distribute the processed messages into various repositories (e.g., databases 152, 154, and 156 shown in FIG. 1). In some embodiments, a single message may be stored in different repositories depending on the properties of the message.

Figure 3:
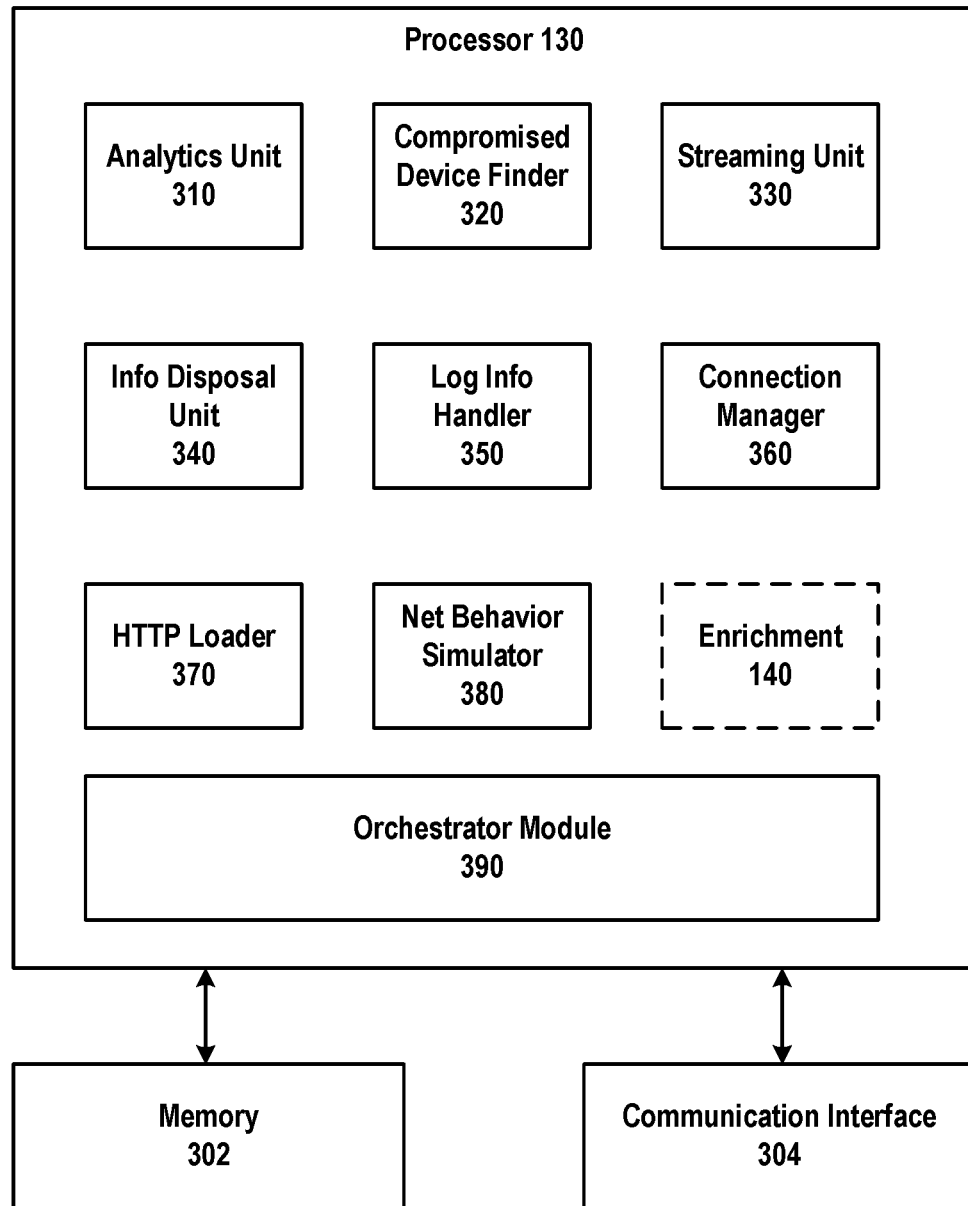
FIG. 3 illustrates an exemplary computer system configured to analyze network traffic, according to embodiments of the disclosure.

FIG. 3 illustrates an exemplary implementation of a computer system 300 configured to analyze network traffic, according to embodiments of the disclosure. As shown in FIG. 3, computer system 300 may include processor 130, a memory system 302, and a communication interface 304. Memory system 395 may include any suitable memories and/or storage media, such as a read only memory (ROM), a flash memory, a random access memory (RAM), a static memory, a hard drive, a semiconductor-based memory, etc., on which computer executable instructions are stored in any suitable format. In some embodiments, memory system 302 may store computer-executable instructions of one or more network traffic analyses program(s), which can be executed by processor 130 to perform various operations and functions.

Communication interface 304 may include any suitable software, middleware, firmware, and/or hardware that are configured to establish communication links between computer system 300 and other components of system 100. For example, communication interface 304 may include wired connection devices such as an Ethernet adapter, a modem, a coaxial cable adaptor, a fiber optical adapter, or the like. In another example, communication interface 304 may include wireless connection devices such as a wireless LAN adapter, a telecommunication modem, a satellite communication modem, a short-range communication adapter for establish short-range wireless connections such as Bluetooth, Zigbee, and/or Z-Wave connections.

Processor 130 may include any suitable processing devices such as a microprocessor, a central processing unit (CPU), a graphics processing unit (GPU), and the like. Processor 130 may be implemented in a centralized or distributed manner, depending on particular applications. As shown in FIG. 3, processor 130 may include multiple functional modules, such as an analytics unit 310 (also referred to as an Analyticsd), a compromised network device finder 320 (also referred to as a worm finder), a streaming unit 330 (also referred to as a streaming control module or Streamd), an information disposal unit 340 (also referred to as a trashman), a log information handler 350 (also referred to as an IPtables loader), a connection manager 360 (also referred to as a connect loader), an HTTP loader 370, a network behavior simulator 380 (also referred to as a Rorschach loader), and an orchestrator module 390. Enrichment service 140 may be optionally implemented as part of processor 130 to provide contextual information to the log data collected by the plurality of network nodes. It is noted that one or more of these functional modules/units/services may be omitted, depending on needs of applications.

In some embodiments, streaming unit 330 may be configured to control message forwarding to receive logged network scanning traffic data from network nodes. For example, streaming unit 330 may control the subscription to message queue 120 and reception of messages forwarded by log forwarders (e.g., 112, 114, 116). In some embodiments, streaming unit 330 may be configured to receive network scanning traffic data from message queue 120 and/or load the received network scanning traffic data into suitable data containers, such as IP tables, for one or more other functional modules (e.g., analytics unit 310) to further process. Information disposal unit 340 may be configured to handle the long-term storage of the received network scanning traffic data. For example, information disposal unit 340 may be coupled to long-term storage 152 and store the received network scanning traffic data in long-term storage 152. HTTP loader 370 may be configured to handle HTTP messages contained in the logged network scanning traffic data. For example, HTTP loader 370 may monitor the network scanning traffic data received from message queue 120 and identify HTTP-type traffic data, such as web inquiries, messages received at specific ports (e.g., port 80), etc. Other functionals modules will be described in greater detail in the following passages.

Processor 130 may parse the mass scanning network traffic data collected by the plurality of network nodes and generate an omnidirectional network traffic database (e.g., database 156). For example, processor 130 may use log information handler 350 to parse the mass scanning network traffic data, which may include, among other things, IP tables containing information pertinent to scanning requests. Log information handler 350 may load IP tables from the mass scanning network traffic data for analytics unit 310 to analyze. Connection manager 360, which has similar function to log information handler 350, may be specifically configured to load information (e.g., messages, inquiries, etc.) that completes an authentication process, such as a TCP handshaking process. As a result, information loaded by connection manager 360 may be more creditable than, for example, regular mass scanning network traffic data that are not authenticated or otherwise verified. In some embodiments, processor 130 may augment, using analytics unit 310, the mass scanning network traffic data collected by multiple network nodes (e.g., network nodes 102, 104, and 106) from multiple geographical locations based on source information of the mass scanning network traffic data. The source information may include a network address of a scanner that initiates a scanning request that forms part of the mass scanning network traffic. For example, the network address may be an IP address of the scanner, which may be contained in the scanning request logged by one or more network nodes. Processor 130 may, using analytics unit 310 and/or log information handler 350, extract the source information and organize the received network scanning traffic data according to the source information. For example, network scanning traffic data originated from a particular IP address may be collected by multiple network nodes around the world. Processor 130 (e.g., using analytics unit 310) may augment the network scanning traffic data originated from the IP address and received by the multiple network nodes to generate a record of that IP address in the omnidirectional network traffic database 156.

In some embodiments, processor 130 may, using analytics unit 310, create tags by applying rules to the information loaded by log information handler 350 and/or connection manager 360. For example, analytics unit 310 may analyze source information of the network scanning traffic data and create tags indicating the origin of a particular network inquiry. In another example, analytics unit 310 may compare the source information (e.g., IP address) with those of known mass scanners to determine whether a particular network inquiry is benign or malicious. The tags created by analytics unit 310 may be stored in omnidirectional network traffic database 156.

In some embodiments, processor 130 may also enrich records stored or to be stored in omnidirectional network traffic database 156 by tagging the records in the omnidirectional network traffic database 156 based on a set of rules. The enrichment may be conducted by enrichment service 140. As described above, enrichment service 140 may be a separate, stand-alone service or an integrated part of processor 130. In some embodiments, processor 130 may enrich the network scanning traffic data by applying tags and/or metadata. For example, information such as the geolocation of a scanner (e.g., country, region, etc.), DNS pointers, and organization information may be extracted or added to database 156. In this way, network scanning traffic associated with known malicious campaigns (e.g., botnets like Mirai) can be identified and tagged by processor 130 and/or enrichment service 140. Processor 130 and/or enrichment service 140 may also filter common pitfalls from the network scanning traffic data. An aging mechanism may be applied by processor 130 and/or enrichment service 140 to place more weight to the more recent data. Spoof traffic may be identified and marked by processor 130 and/or enrichment service 140. It is noted that some or all of the enrichment function may also be implemented by analytics unit 310. In some embodiments, analytics unit 310 and enrichment service 140 may operate in tandem to create tags.

In some embodiments, omnidirectional network traffic database 156 may be provided to users (e.g., 172, 174, 176) in bulk. For example, the entire database data may be provided to a user for filtering out background noise-type omnidirectional mass scanning network traffic. Because omnidirectional network traffic database 156 is generated based on network scanning traffic data collected from many places around the world, database 156 can represent a near complete set of, if not all, background noise-type network traffic on the Internet. A full set of developer APIs may also be provided to users to facilitate customized utilization of database 156. API calls may be handled by API servers 160 to provide the users access to database 156 and/or document store 154.

In some embodiments, different scanners (e.g., the sources that initiate scanning requests) may be labeled differently by processor 130 and/or enrichment service 140. For known benign scanners, such as search engines, research organizations, etc., the corresponding network scanning traffic may be labeled as safe traffic or a relatively low priority in terms of security risk. On the other hands, if a scanner can be identified as malicious, then the network scanning traffic originated from or otherwise associated with that scanner may be labeled accordingly, such as a relatively high priority in terms of security risk. It is noted that although some network scanning traffic are from known malicious actors, the scanning traffic are nonetheless omni-directional and non-targeted. Therefore, they may still be considered as background noise-type of network traffic.

A user (e.g., user 172) can use omnidirectional network traffic database 156 in many ways. For example, database 156 may be used as a filter to filter out those background noise-type of network traffic from the user's own network traffic data (e.g., from the user's own SIEM). For example, the user's own network traffic database may be compared with omnidirectional network traffic database 156 to remove all of the network traffic that appear in omnidirectional network traffic database 156. This can be done based on the source information of the network traffic (e.g., the IP addresses of the scanners that originate the scans). After the filtering, what is left out in the user's own network traffic database are targeted specifically to the user. Some of the targeted traffic may be normal and regular traffic, such as user logins. Others may be suspicious, including targeted attacks or those exploiting security vulnerabilities. In some embodiments, the user's STEM (e.g., STEM 182), through its integrated module (e.g., integration 192), may depriori-tize the omnidirectional network traffic in network security management tasks. In this way, the user may refocus the attention on the targeted network traffic, thereby improving the efficiency of the security management.

In some embodiments, contextual information may be provided to the user through API servers 160. The contextual information may include information about any specific background noise-type of network event. For example, the user may query database 156 for the metadata and/or tag information resulting from the enrichment process per-formed by processor 130 and/or enrichment service 140. For example, the user can query a network event based on the source information (e.g., the IP address of the initiator). Processor 130 and/or database 156 may then return the contextual information corresponding to the source infor-mation to the user via, for example, API server 160. The contextual information may include, for example, temporal information of recording a source of mass scanning network traffic event (e.g., first seen time, last seen time), a port number scanned by the source, an Autonomous System Number (ASN) associated with the source, geographical location information of the source, organizational informa-tion of the source, or a type of the source (e.g., residential, business, mobile, etc.).

In some embodiments, processor 130 may forecast upcoming network events by analyzing trending information using, for example, analytics unit 310. For example, when processor 130 detects a surging number of probes occur in one or more regions, processor 130 may forecast similar surges in other regions.

In some embodiments, processor 130 may receive user feedback including targeted network traffic specific to a particular user. Processor 130 may compare the feedback from multiple users and identify sources targeting more than one user. For example, processor 130 may receive multiple queries from multiple users, each including a respective network scanning activity from the same source. Processor 130 may then determine whether the network scanning activities are targeted or omnidirectional scanning activities. For example, processor 130 may determine whether the source of the network scanning activities is present in the omnidirectional network scanning traffic database 156. If so, then it may indicate that the network scanning activities are not targeted. On the other hand, if the source is absent from database 156, then it may indicate that the network scanning activities are targeted, and processor 130 may tag the source as suspicious of conducting micro-targeting network scans when the number of the targeted organizations exceeds a threshold. The threshold may be predetermined (e.g., more than 10, 50, or 100 organizations) or dynamically deter-mined based on network conditions at a particular geo-graphical area or within a specific time span. In some embodiments, sources tagged as conducting micro-targeting network scans may be treated as riskier (or with a higher priority) than those conducting omnidirectional mass scans, but less risky (or with a lower priority) than those conduct-ing targeted scans in the context of network security man-agement.

Figure 4:
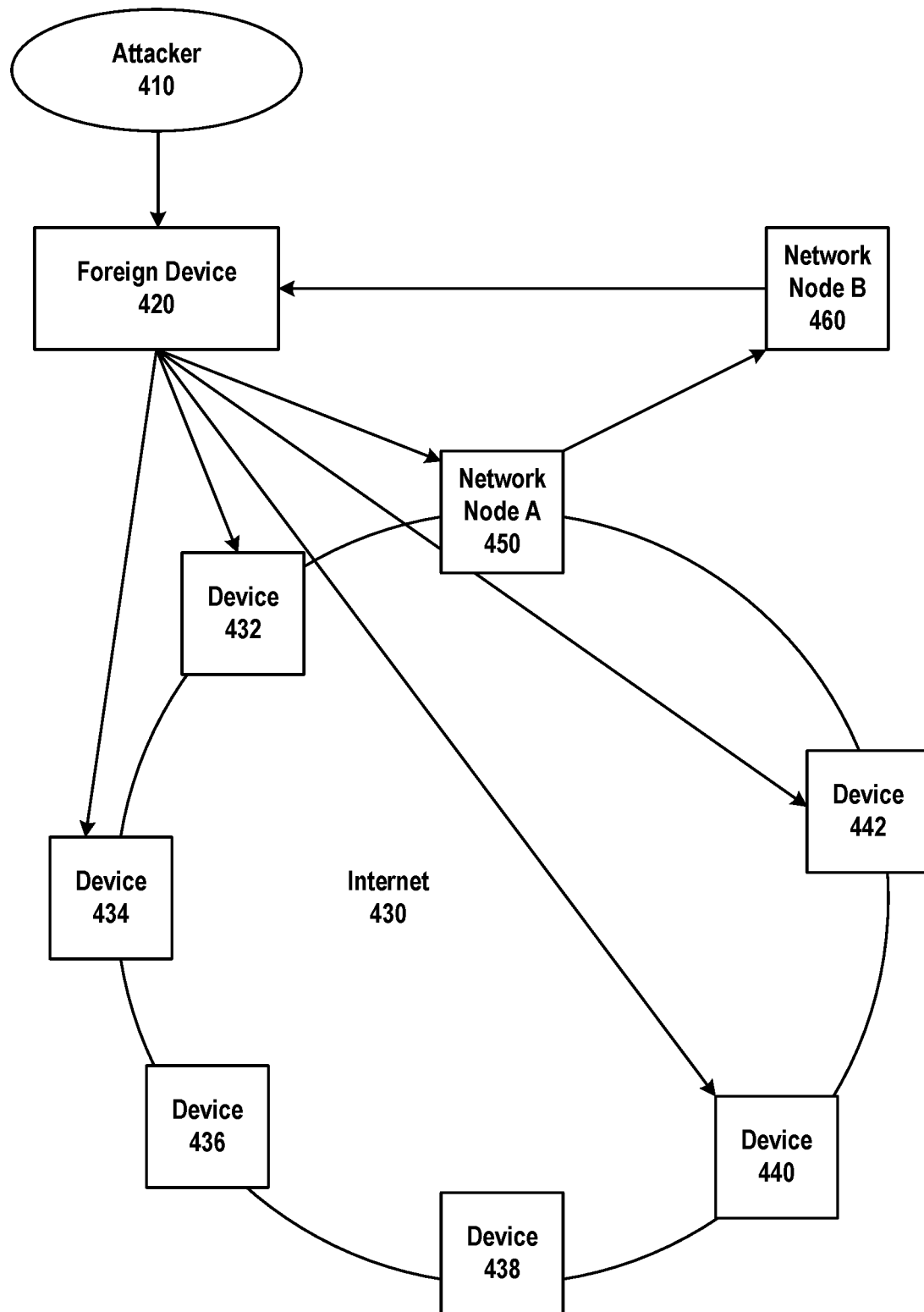
FIG. 4 illustrates an exemplary system for detecting compromised network devices, according to embodiments of the disclosure

In some embodiments, processor 130 may identify com-promised devices on the Internet. This functionality may be implemented by compromised device finder 320 shown in FIG. 3. FIG. 4 illustrates an exemplary system for detecting compromised network devices, according to embodiments of the disclosure. Referring to FIG. 4, an attacker 410 may exploit a vulnerability of a susceptible foreign device 420 and infect device 420. The infected foreign device 420 may then start probing the Internet 430 for the same vulnerability. For example, the infected foreign device 420 may probe (e.g., by sending probing/scanning requests to) a plurality of devices 432, 434, 440, 442, and 450 on the Internet 430 (some devices on the Internet such as 436, 438 may not be probed for various reasons, e.g., behind firewalls). Of the probed devices, device 450 may be one of the network nodes deployed by processor 130. The probing/scanning request sent by the infected foreign device 420 may then be for-warded to processor 130, as described above in connection with FIG. 1. In response to the reception of the scanning/probing request, processor 130 may control another network node 460 to transmit the same network scanning/probing request to the source scanner (foreign device 420) based on the source information extracted from the scanning/probing request. For example, if foreign device 420 scans a network port of network node 450, then processor 130 may control network node 460 to scan the same port of foreign device 420. If feedback from foreign device 420 indicates that the port of foreign device 420 is open, then processor 130 may determine that foreign device 420 is likely compromised (e.g., infected). In another example, foreign device 420 may scan/probe a port/protocol pair (e.g., HTTP on port 80). Processor 130 may control network node 460 to scan/probe the same port/protocol pair of foreign device 420 after network node 450 receives the scanning request from foreign device 420 and forwards the scanning request to processor 130. If feedback from foreign device 420 indicates that the port/protocol pair is present at foreign device 420, then processor 130 may determine that foreign device 420 is likely compromised. In a further example, foreign device 420 may request a file, service, or path from network node 450. After receiving the request forwarded by network node 450, processor 130 may command network node 460 to request the same file, service, or path from foreign device 420. If feedback from foreign device 420 indicates that the file, server, or path is present at foreign device 420, then processor 130 may determine that foreign device 420 is likely compromised.

In some embodiments, network node 450 that receives a scanning/probing request from foreign device 420 and network node 460 that probes foreign device 420 with the same scanning/probing request may be located in different geographical regions. For example, network nodes 450 and 460 may be located in different continents, different countries, or different provinces/states. In some embodiments, network nodes 450 and 460 may be provided by different cloud computing service providers. For example, network nodes 450 may be a Google Cloud network node and network nodes 460 may be an AWS network node.

Figure 5:
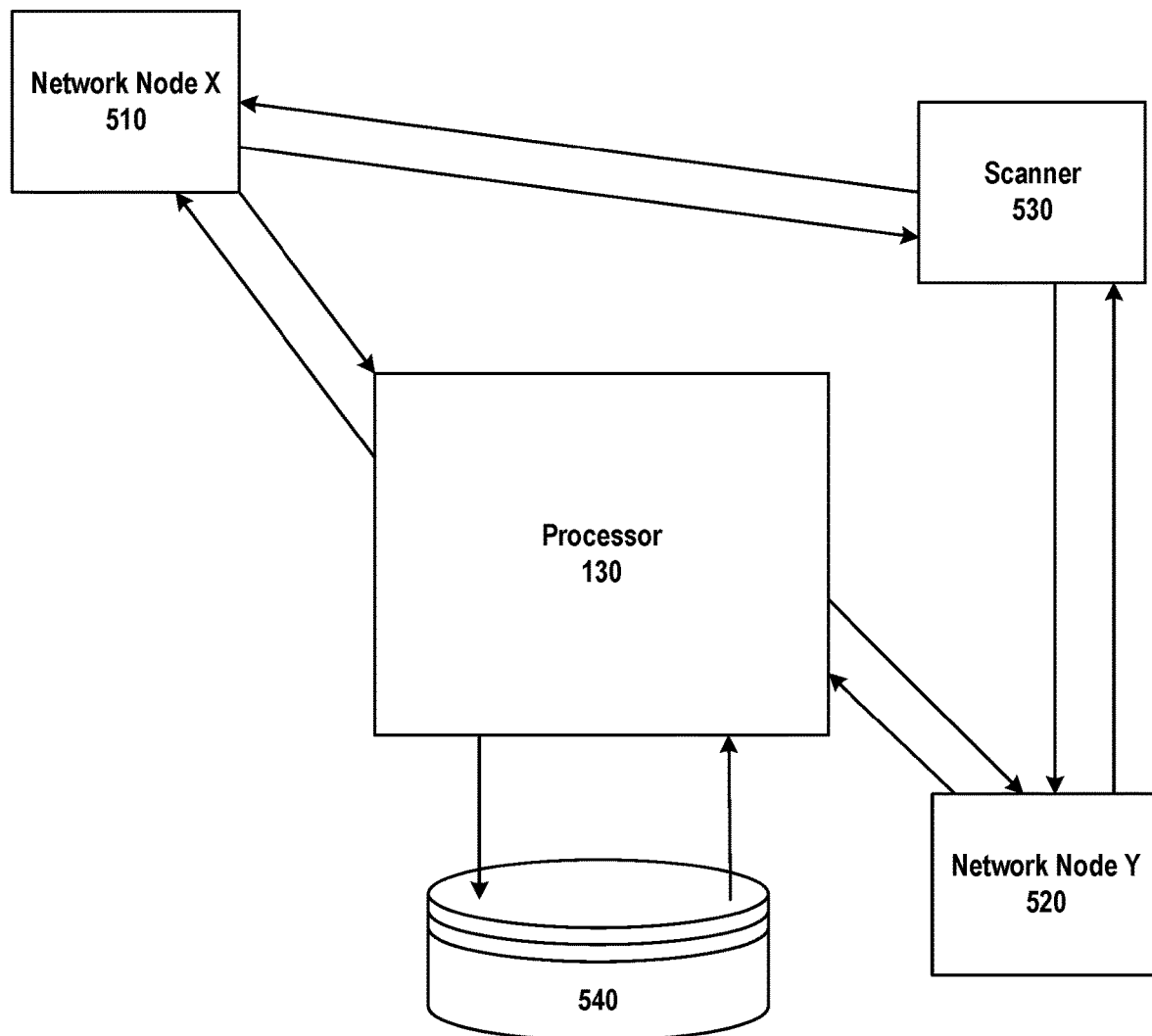
FIG. 5 illustrates an exemplary system for simulating general behaviors of network devices in response to network scanning inquiries, according to embodiments of the disclosure.

System 100 disclosed herein may simulate the behavior of a regular network device based on information collected from the Internet. This functionality may be implemented by network behavior simulator 380 shown in FIG. 3 with companion network nodes (also referred to as Rorschach nodes) that are specially configured to react to scanning/probing inquiries. FIG. 5 illustrates an exemplary system for simulating general behaviors of network devices in response to network scanning inquiries, according to embodiments of the disclosure. Referring to FIG. 5, processor 130 may receive a first network inquiry from a network node 510 configured as a Rorschach node. For example, network node 510 may be configured to have multiple network ports open to listen to scanning/probing inquiries. In some embodiments, network node 510 may have all of the network ports (e.g., from port 0 to port 65535) open to receive scanning/probing inquiries. After any open port receives a network inquiry, network node 510 may notify processor 130 about the inquiry including the source information of the scanner of the inquiry (scanner 530). Processor 130 may determine, based on the inquiry, a group of candidate responses. The group of candidate responses may be selected from a database 540 storing Internet-wide historical responses to the inquiry or the kind of inquiry received by network node 510. For example, database 540 may contain records based on third-party data (e.g., network researcher such as Shodan) that contain responses from devices around the Internet to the specific inquiry. Processor 130 may select, for example, the N most common responses, the N least common responses, etc., and form the group of the candidate responses based on the selection.

Processor 130 may select a response from the group of candidate responses and instruct network node 510 to respond to scanner 530 using the selected response. In some embodiments, network node 510 may select a response from the group of candidate responses and respond to scanner 530's network inquiry. The selection of the response may be based on a variety of factors. For example, the response may be selected randomly from the group. In another example, the response may be selected in a sequential order from the group according to a frequency of appearances or a number of occurrences in database 540 (e.g., from the most common to the least common or from the least common to the most common). The response may take any suitable form. For example, the response may include a bit sequence, an acknowledgement, a service response, a path, etc.

After network node 510 receives the scanning inquiry from scanner 530 and responds to scanner 530 with the response selected from the group of candidate responses, another network node 520, which is also configured as a Rorschach node, may also receive a scanning inquiry from the same scanner 530 (e.g., based on the source information such as the IP address of scanner 530). Network node 520 may send information of scanner 530 to processor 130, which may then select a different response from the group of candidate responses to respond to the scanning inquiry. Similar to network node 510, the selection of the response for sending from network node 520 may also be performed by network node 520. If another network node receives a scanning inquiry from the same scanner 530, that network node may respond to scanner 530 using yet another response selected from the group, different from the responses selected for both network nodes 510 and 520. In this way, different network nodes of system 100 may conduct an A/B testing to scanner 530 to gauge the purpose of the scanning activity. Because each time a network node responds to the same scanner 530 with a different response selected from a group of candidate responses drawn from a pool representing the whole Internet, the network nodes collectively simulate the behavior of what regular network devices on the Internet would respond to the scanner's scanning inquiries, and at the same time cycle through agnostically different kinds of responses to detect the intent or purpose of scanner 530. In this way, each network node so configured is capable of listening and responding to any scanning inquiry sent to any network port requesting for anything. Instead of reinventing any particular protocol to provide a proper response, system 100 can borrow the response from the whole Internet. From the reactions scanner 530 provides after receiving a selected response, contextual information may be obtained as to the purpose of the scanning.

In some embodiments, system 100 may apply tags or labels to the network scanning traffic data collected by the plurality of network nodes. This functionality may be implemented by analytics unit 310 shown in FIG. 3. For example, the network scanning traffic data can be organized according to the source information (e.g., source IPs) and stored in database 156. Analytics unit 310 may query database 156 with a set of rules to determine if any record in the database matches any of the rules. If so, then one or more tags or labels corresponding to the rules may be applied to the record. The tags and labels may provide context to the records in the database and may be provided to users for reference (e.g., via API servers 160).

In some embodiments, orchestrator module 390 (e.g., implemented using Terraform developed by HashiCorp) may be configured to deploy network nodes. For example, orchestrator module 390 may communicate with various cloud service providers and automatically set up network nodes as passive listeners (e.g., 102, 104) or Rorschach nodes (e.g., 510, 520). Orchestrator module 390 may determine a list of IP addresses for candidate network nodes based on criteria such as the cloud service provider, region, desired sampling density, randomness, etc. Orchestrator module 390 may also configured the network nodes differently in terms of activeness, the number of open ports, and dummy services. Each network node may generate a message including the logged network traffic data and send the message to message queue 120 (e.g., at a rate about one message per second). The message may include, for example, header information such as node type, topic, region, source, version, etc.; and message content (e.g., encompassed in an envelope) such as node information, event type, timestamp, region, source node IP, version, hosting provider, event ID, content of the event (e.g., an IP table), etc.

Figure 6:
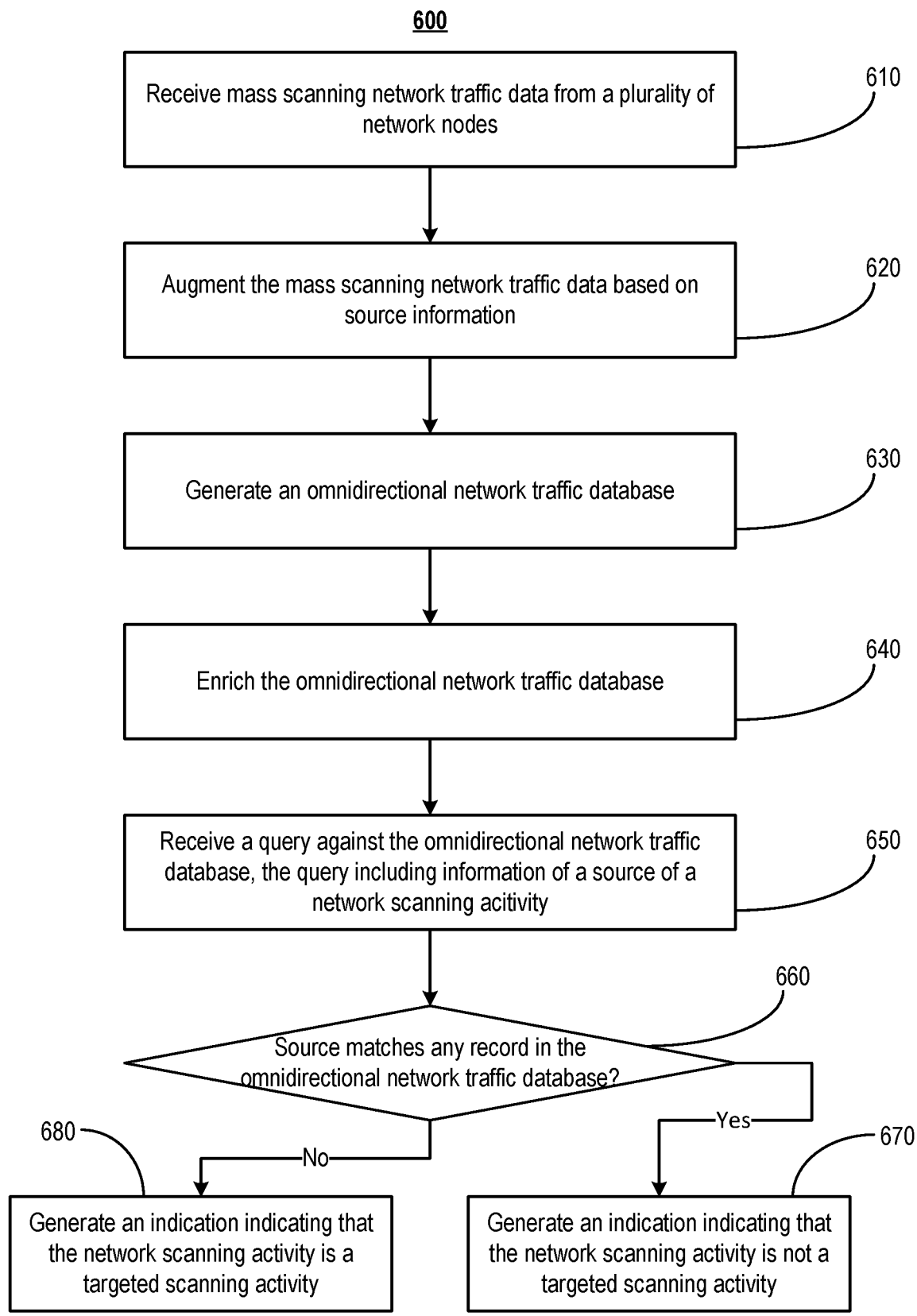
FIG. 6 is a flowchart of an exemplary method for analyzing network traffic, according to embodiments of the disclosure.

FIG. 6 is a flowchart of an exemplary method 600 for analyzing network traffic, according to embodiments of the disclosure. Method 600 may be performed by components of system 100, for example, processor 130 and/or network nodes 102/104/106. Method 600 may include several steps, some of which may be omitted. In addition, the steps may be performed in a different order than the one shown in FIG. 6. One or more steps may also be performed simultaneously.

In step 610, processor 130 may receive mass scanning network traffic data from a plurality of network nodes such as 102, 104, and 106. For example, processor 130 may subscribe to message queue 120 to receive the mass scanning network traffic data collected by the plurality of network nodes and forwarded by their respective log forwarders such as 112, 114, and 116. The plurality of network nodes may be distributed across the Internet and around the world. For example, they can be deployed by processor 130 in different cloud computing service platforms and are located in datacenters of multiple cloud computing service providers. The network nodes may receive network traffic via one or more network ports and log the received network traffic data locally. The logged network traffic data may then be forwarded by the log forwarders to message queue 120, which may handle the message delivery from the network nodes to processor 130 using, for example, a publish-subscribe mechanism.

In step 620, processor 130 may augment the received mass scanning network traffic data based on source information of the mass scanning network traffic data. The source information may include a network address (e.g., IP address) of a scanner that initiates a mass scanning request, which forms part of the scanning network traffic data. Processor 130 may augment the mass scanning network traffic data by sorting all scanning requests initiated or originated from the same source scanner. The augmented mass scanning network traffic data may provide insights and contextual information about the scanners and the scanning activities.

In step 630, processor 130 may generate an omnidirectional network traffic database (e.g., database 156) based on, for example, the augmented mass scanning network traffic data. For example, processor 130 may create a record in database 156 for each source IP contained in the augmented mass scanning network traffic data, along with one or more scanning activities initiated from that source IP. In this way, database 156 may include a list of all IP addresses that mass scan the Internet and associate the mass scanning network traffic with respective sources of the mass scanning network traffic.

In step 640, processor 130 and/or enrichment service 140 may enrich the omnidirectional network traffic database by tagging or labelling records in the omnidirectional network traffic database based on a set of rules. As discussed above, the set of rules may include determination of the geolocation, DNS pointers, and organization information of a particular scanning traffic activity; whether a scanning activity is associated with known malicious campaigns; and filtering of common pitfalls. The tagging/labelling process may provide rich contextual information to the scanning traffic activities stored in the omnidirectional network traffic database (e.g., database 156). The contextual information may include, for example, temporal information of recording a source of mass scanning network traffic event (e.g., first seen time, last seen time), a port number scanned by the source, an Autonomous System Number (ASN) associated with the source, geographical location information of the source, organizational information of the source, or a type of the source (e.g., residential, business, mobile, etc.).

In step 650, processor 130 may receive a query against the omnidirectional network traffic database (e.g., database 156). The query may include information of a source of a network scanning activity. For example, the query may be received from a user (e.g., user 172) via API servers 160. The query may include source information such as an IP address of a scanner of the network scanning activity.

In step 660, processor 130 may determine whether the source matches any record in the omnidirectional network traffic database (e.g., database 156). For example, processor 130 may search in database 156 for any matching record. Because database 156 essentially stores a near complete list of all the sources that generate the Internet background noise, a matching recording in the database many indicate that the scanning activity is likely a background noise type of omnidirectional scanning activity. If this is the case, then method 600 proceeds along the "Yes" branch to step 670, in which processor 130 may generate an indication indicating that the network scanning activity is not a targeted scanning activity, and processer 130 may deprioritize such a non-targeted scanning activity. On the other hand, if no match is found, then method 600 proceeds along the "No" branch to step 680, in which processor 130 may generate an indication indicating that the network scanning activity is a targeted scanning activity. The indication may take various forms. For example, processor 130 may generate an alert alerting a user that that network scanning activity is a targeted scanning activity based on the determination in step 660 that no record matches the source. In another example, processor 130 may generate context information stored in the omnidirectional network traffic database corresponding to a recording matching the source as an indication that the network scanning activity is not targeted. The context information may include any suitable information collected, analyzed, and/or enriched by system 100 as discussed above.

Embodiments of the present disclosure may analyze the intent of a network scanner using, for example, a plurality of Rorschach nodes described in connection with FIG. 5. In some embodiments, this functionality may be implemented by network behavior simulator 380 shown in FIG. 3. As discussed above, one or more network scanners may scan the Internet (e.g., the entire IPv4 space) or a portion thereof by sending unsolicited network connection requests to machines connected to the Internet. Such mass scanning activities may be for various purposes. For example, some scanning activities may be harmless, such as those for network security research. Some scanning activities may be malicious, such as those distributing malware exploiting vulnerabilities. While it is very hard to determine the intent of a particular scanning activity received at a particular machine, certain types of scanning activities may exhibit patterns that can be ascertained to understand the intent of the network scanners. For example, a network scanner programmed to inject malware to exploit a particular vulnerability may first survey the Internet or a portion thereof to determine criteria for sending the malware (e.g., determining machines that likely have the vulnerability). This can be done in various way, such as obtaining network service identification information including service banners using banner grabbing techniques. When the vulnerability is server- or service-specific (e.g., affecting only nginx servers), the network scanner may send downstream payload (e.g., malware) after determining that a victim machine meets the criteria (e.g., exhibiting features of a nginx server). This and similar network scanning patterns (e.g., "surveying first, payload to follow") can be detected and analyzed by processor 130 (e.g., using network behavior simulator 380) based on information collected by a plurality of network nodes (e.g., Rorschach nodes).

Figure 7:
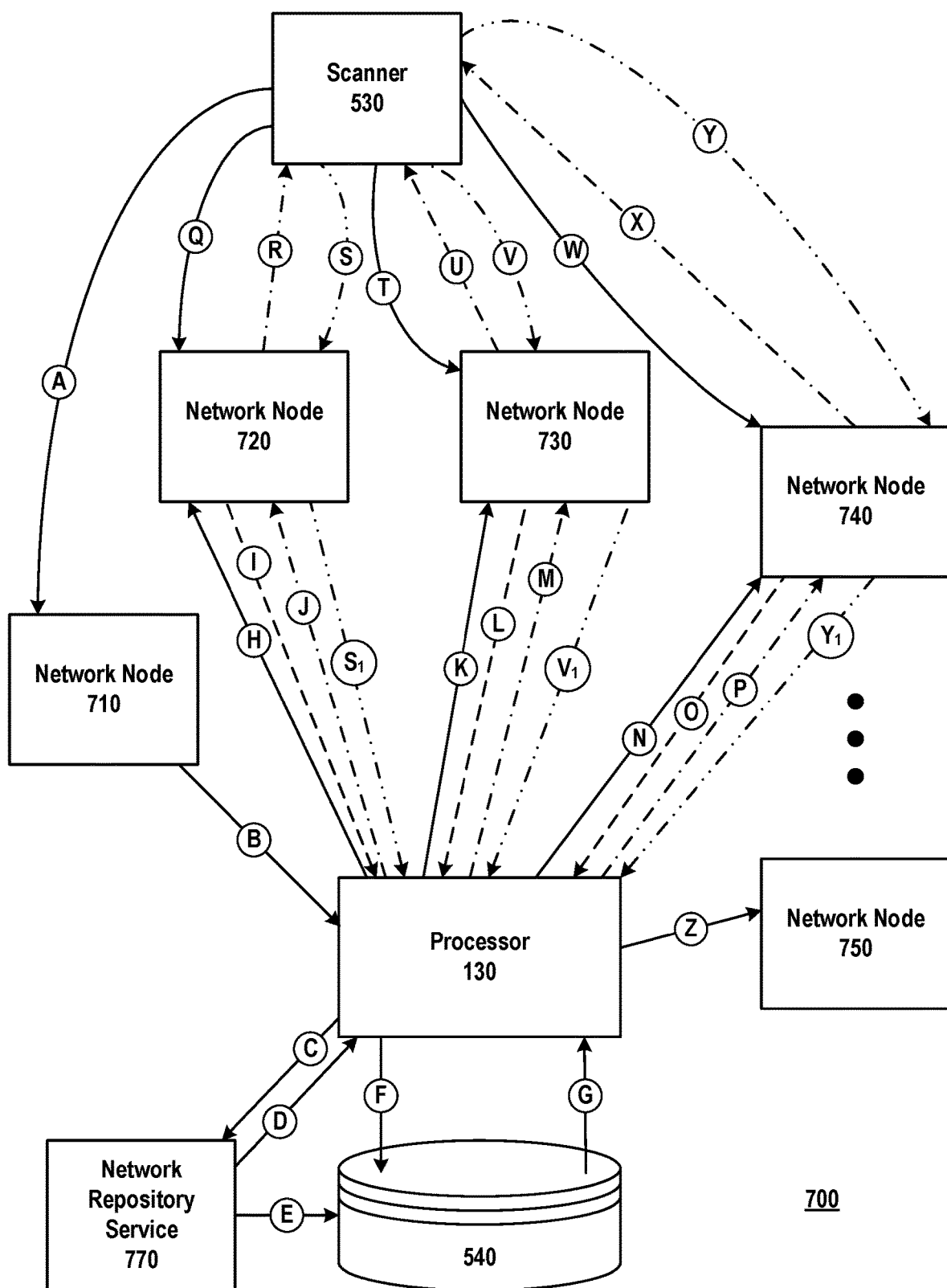
FIG. 7 illustrates an exemplary system for analyzing network traffic to evaluate the intent of a network scanner, according to embodiments of the disclosure.

FIG. 7 illustrates an exemplary system 700 for analyzing network traffic to evaluate the intent of a network scanner, according to embodiments of the disclosure. In the following, FIG. 7 will be discussed together with FIGS. 8A-8C, which show a flowchart of an exemplary method 800 for analyzing network traffic to evaluate the intent of a network scanner, according to embodiments of the disclosure. Method 800 may be performed by components of system 100, for example, processor 130 and/or network nodes 102/104/106. Method 800 may include several steps, some of which may be omitted. In addition, the steps may be performed in a different order than the one shown in FIGS. 8A-8C. One or more steps may also be performed simultaneously.

Referring to FIG. 7, system 700 may include processor 130 and a plurality of network nodes (e.g., 710, 720, 730, 740, . . . , 750). Network nodes 710-750 may be similar to network nodes 510 and 520 shown in FIG. 5, and may include additional functionalities to be described in greater detail below. A network repository service 770 may provide network connection metadata of the Internet, such as service banners. A service banner may include information about the server that provides that service and/or information about the service, such as information about the server/service software (e.g., type, name, version, etc.), what options the service supports, a welcome message, etc. Exemplary network repository services include Shodan (www.shodan.io), scans.io by University of Michigan, critical.io, Project Sonar by Rapid7 (www.rapid7.com/research/project-sonar/), etc. Processor 130 may access network repository service 770 in real time or periodically to obtain network connection metadata. Processor 130 may store the obtained network connection metadata in database 540.

Figure 8A:
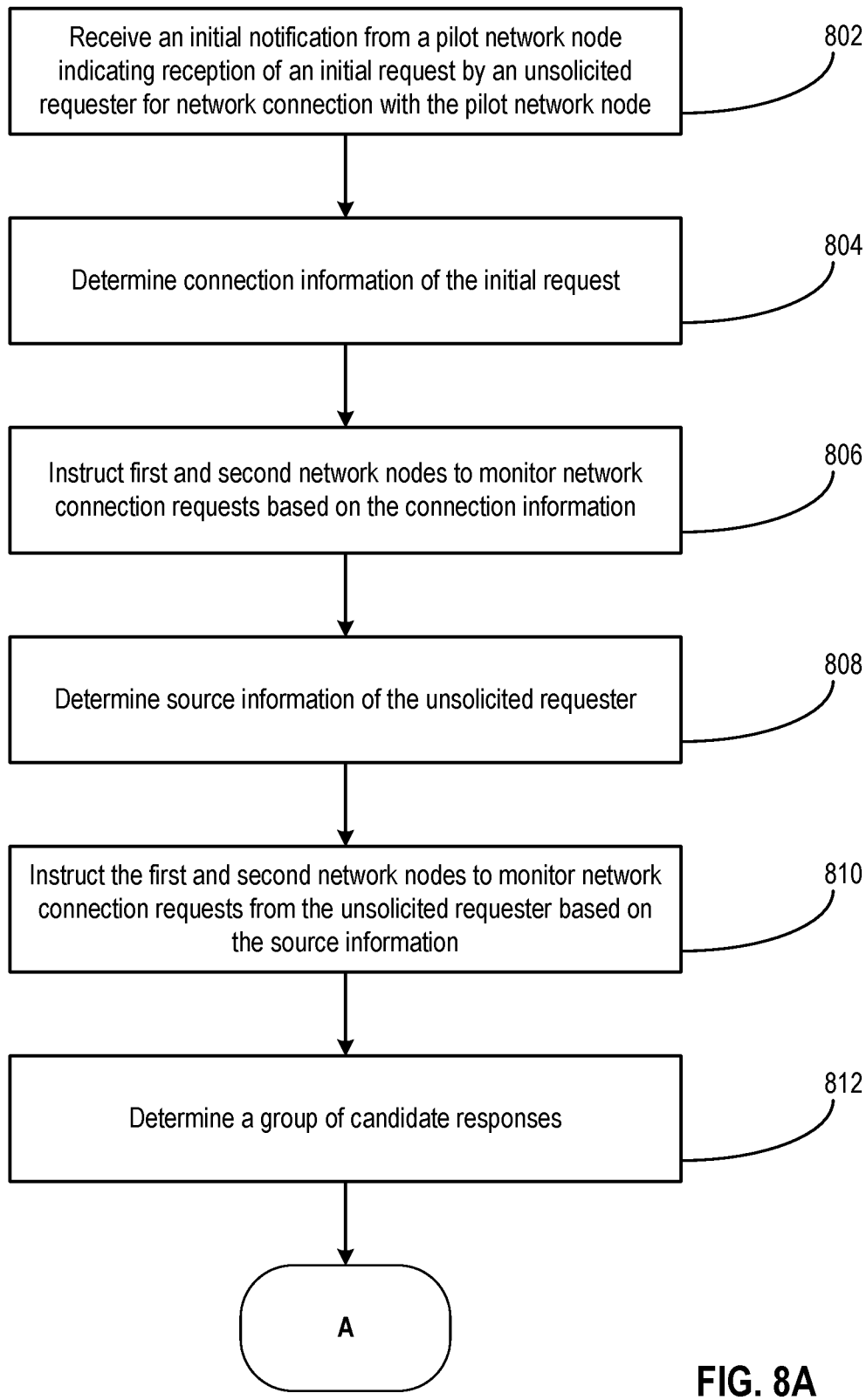
FIGS. 8A-8C show a flowchart of an exemplary method for analyzing network traffic to evaluate the intent of a network scanner, according to embodiments of the disclosure.

Referring to FIG. 8A, method 800 may start from step 802, in which processor 130 may receive an initial notification from a pilot network node indicating reception of an initial request by an unsolicited requester for network connection with the pilot network node. Referring to FIG. 7, scanner 530 may be an unsolicited requester conducting network scanning. Scanner 530 may send an initial request to a pilot network node 710 for network connection with network node 710, indicated by an information transmission path A (hereinafter referred to as path A, a simplification similarly applied to other letter-denoted information transmission paths shown in FIG. 7). After receiving the initial request, network node 710 may send an initial notification to processor 130 indicating the reception of the initial request, along path B. The initial notification may include, for example, the initial request received by network node 710 and/or information derived from the initial request. For instance, the initial notification may include connection information of the initial request, such as the port to which scanner 530 requests to connect with network node 710, the protocol that scanner 530 uses in the initial request for network connection with network node 710, etc. In another example, the initial notification may include source information of scanner 530, such as the IP address of scanner 530.

It is noted that any network node in system 700 may function as the pilot network node. In other words, the designation of the "pilot network node" is not reserved for any specific network node. Rather, any network node in system 700 receiving an unsolicited network connection request from an unsolicited requester may be referred to as the pilot network node, so long as the reception of the unsolicited network connection request initiates the follow-up analytical actions disclosed herein. In some embodiments, when a network node receives an unsolicited network connection request from a previously unknown requester/scanner, the network node may be referred to as a pilot network node and the received unsolicited network connection request may be referred to as the initial request. To determine whether a requester/scanner is previously known to system 700, the receiving network node may extract source information of the requester/scanner from the initial request and send to processor 130, or forward the initial request to processor 130 so that processor 130 may extract the source information. Processor 130 may then compare the source information with existing or known source information stored in database 540 to determine whether the requester/scanner is new (e.g., previously unknown) to system 700.

In step 804, processor 130 may determine, based on the initial notification, connection information of the initial request. For example, the connection information may be contained in the initial notification and processor 130 may analyze the initial notification and extract the connection information from the initial notification. In another example, the connection information may be embedded or encoded in the initial notification and processor 130 may parse the initial notification to obtain the embedded or encoded connection information. As described above, the connection information may include port information, protocol information, or the like. For example, scanner 530 may scan for DNS servers at port number 53 using UDP protocol (denoted as UDP/53). In this case, the connection information may include the port number: 53, and/or the protocol: UDP. In another example, scanner 530 may scan for SSH servers at port number 22 using TCP protocol (TCP/22). In this case, the connection information may include the port number: 22, and/or the protocol: TCP. Other examples include HTTP (TCP/80), HTTPS (TCP/443), NTP (UDP/123), Microsoft RDP (TCP/3389), SQL Server (TCP/1433), MySQL (TCP/3306), SMTP (TCP/25), etc.

In step 806, processor 130 may instruct first and second network nodes to monitor network connection requests based on the connection information. Referring to FIG. 7, processor 130 may instruct network nodes 720 and 730 (along paths H and K, respectively) to monitor network connection requests based on the connection information. For example, processor 130 may instruct network nodes 720 and 730 to monitor TCP network connection requests at port 22 (e.g., to monitor SSH connections). In another example, processor 130 may instruct network nodes 720 and 730 to monitor UDP network connection requests at port 53 (e.g., to monitor DNS connections). In some embodiments, processor 130 may instruct a network node to monitor network connection requests using a particular protocol on a particular port by allowing reception of external network traffic data organized according to that particular protocol on that particular port. For example, if the port is not previously open, processor 130 may instruct the network node to open the port. In another example, if the port is not previously set up to receive network traffic data of a certain protocol, processor 130 may instruct the network node to set up the protocol.

In some embodiments, processor 130 may similarly instruct other network nodes, such as 740 and 750 (along paths N and Z, respectively) to monitor network connection requests based on the connection information. For example, processor 130 may instruct all of the network nodes in system 700 except the pilot network node to monitor network connection requests based on the connection information.

In step 808, processor 130 may determine source information of the unsolicited requester based on the initial notification. For example, referring to FIG. 7, pilot network node 710 may extract or otherwise determine the source information of scanner 530 based on the initial request. Pilot network node 710 may then send the source information to processor 130 through the initial notification. Processor 130 may determine the source information from the initial notification sent by pilot network node 710. In another example, pilot network node 710 may not extract or determine the source information. Rather, pilot network node 710 may send the initial request sent by scanner 530 and/or information derived from the initial request to processor 130 through the initial notification. Processor 130 may then determine the source information by analyzing the initial notification and extracting the source information from the initial notification. In some embodiments, the source information may include the IP address of scanner 530.

In step 810, processor 130 may instruct the first and second network nodes to monitor network connection requests from the unsolicited requester based on the source information. Referring to FIG. 7, processor 130 may instruct network nodes 720 and 730 (along paths H and K, respectively) to monitor network connection requests from scanner 530 based on the source information. For example, processor 130 may instruct network nodes 720 and 730 to monitor network connection requests sent from the IP address of scanner 530. In some embodiments, the monitoring may be implemented by flagging the IP address of scanner 530 such that a network connection request sent from the IP address of scanner 530 may trigger one or more operations of the network node receiving the network connection request, including sending the received network connection request or information derived therefrom to processor 130, sending one or more responses to scanner 530, etc. In some embodiments, processor 130 may similarly instruct other network nodes, such as 740 and 750 (along paths N and Z, respectively) to monitor network connection requests from scanner 530 based on the source information. For example, processor 130 may instruct all of the network nodes in system 700 except the pilot network node to monitor network connection requests from scanner 530 based on the source information.

In some embodiments, steps 804 and 806 may be performed after steps 808 and 810. In some embodiments, steps 804+806 may be performed simultaneously with steps 808+810. In some embodiments, steps 804, 806, 808, and 810 may be performed in any order, as long as step 806 is performed after step 804, and step 810 is performed after step 808 (e.g., 804→808→806→810; 808→804→806→810, etc.). In some embodiments, steps 804+806 may be omitted. For example, network nodes in system 700 may monitor network connection requests on all the ports and/or for any protocol, regardless of whether any particular port or any particular protocol is identified from the initial request. In some embodiments, steps 808+810 may be omitted. For example, network nodes in system 700 may monitor network connection requests from all external sources, regardless of whether any particular source is identified from the initial request.

In step 812, processor 130 may determine a group of candidate responses. In some embodiments, processor 130 may determine the group of candidate responses in a similar way to the method of determining candidate responses in connection with FIG. 5, in which the group of candidate responses may be selected from a database 540 storing Internet-wide historical responses to the initial request or the kind of the initial request received by pilot network node 710. For example, the group of candidate responses may include network service identification information such as service banners. Exemplary service banners may include Apache banner, IIS banner, nginx banner, etc. Referring to FIG. 7, processor 130 may directly access network repository service 770 in real time or periodically to obtain the group of candidate responses (along paths C and D). In another example, processor 130 may access network repository service 770 and store network connection meta data provided by network repository service 770 in database 540 (e.g., along paths C-D-F and/or C-E). Database 540 may also fetch network connection meta data from network repository service 770 (along path E). Processor 130 may access database 540 to obtain the group of candidate responses (along paths F and G).

In some embodiments, referring to FIG. 7, after processor 130 determines the group of candidates response, processor 130 may send the first candidate response in the group to a first network node (e.g., network node 720 along path J), send the second candidate response in the group to a second network node (e.g., network node 730 along path M), send the third candidate response in the group to a third network node (e.g., network node 740 along path P), etc. In this way, network nodes 720, 730, 740, etc. may store the respective candidate responses locally. In some embodiment, processor 130 may not send the candidate responses to network nodes. Instead, processor 130 may select a candidate response from the group and send to a network node after that network node receives a request for network connection from the same source that sends the initial request (e.g., scanner 530). Processor 130 may sequentially or randomly select additional candidate responses from the rest of the group after more network nodes receive requests for network connection from that same source (e.g., scanner 530). In some embodiments, processor 130 may not determine the group of candidate responses upfront. Instead, processor 130 may determine a candidate response dynamically after one or the network nodes in system 700 receives a request for network connection from scanner 530.

Figure 8B:
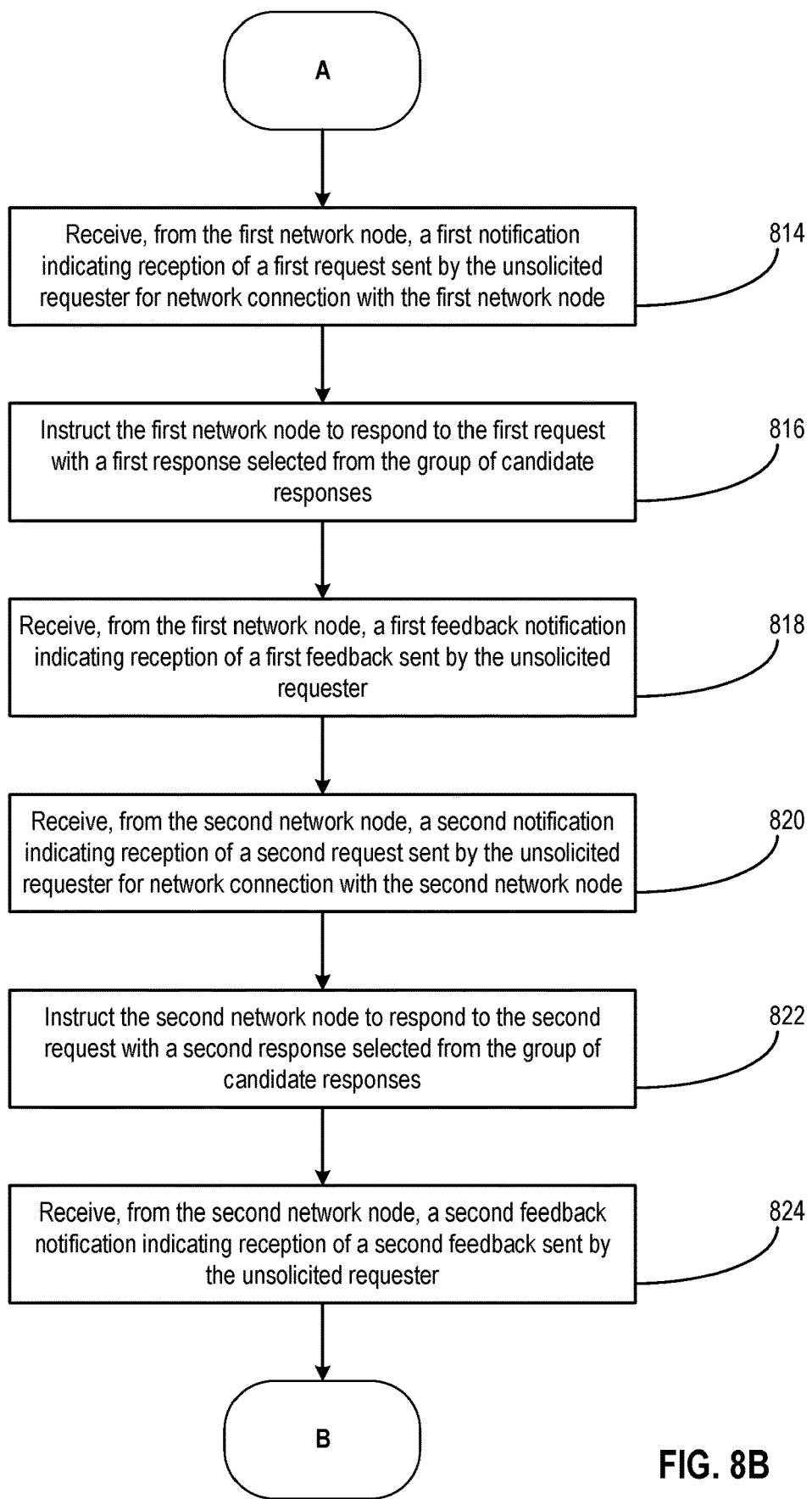

Referring to FIG. 8B, method 800 proceeds to step 814, in which processor 130 may receive, from the first network node (e.g., network node 720), a first notification indicating reception of a first request sent by the unsolicited requester (e.g., scanner 530) for network connection with the first network node. Referring to FIG. 7, scanner 530 may send a request for network connection with network node 720 along path Q, similar to the sending of the initial request to pilot network node 710 along path A. After receiving the request, network node 720 may send a notification to processor 130 along path I, indicating the reception of the request, similar to the sending of the initial notification to processor 130 along path B.

In step 816, processor 130 may instruct the first network node to respond to the first request with a first response selected from the group of candidate responses. Referring to FIG. 7, processor 130 may select a candidate response from the group and instruct network 720, along path J, to respond to scanner 530 with the selected response. For example, processor 130 may send the selected candidate response, such as an Apache banner, to network node 720 along path J. In some embodiments, processor 130 may dynamically determine a response from network repository service 770 and/or database 540, and send the determined response to network node 720 along path J. In some embodiments, one or more candidate responses may be stored locally at network node 720, and processor 130 may instruct network node 720 to respond to scanner 530 with one of the stored candidate responses. In any case, network node 720 may, for example, show the Apache banner to scanner 530 as the response to the request from scanner 530 (along path R).

After network node 720 responds to the request from scanner 530, scanner 530 may or may not provide further feedback to network node 720 along path S. In the case that no feedback is received, method 800 may skip step 818 and proceed to step 820. On the other hand, when scanner 530 does send feedback, the feedback may be sent to network node 720 along path S in the form of a bit sequence. In this case, method 800 proceeds to step 818, in which processor 130 may receive, from the first network node, a first feedback notification indicating reception of a first feedback sent by the unsolicited requester. For example, as shown in FIG. 7, after network node 720 receives the feedback, network node 720 may send a feedback notification to processor 130 along path Si, indicating reception of the feedback sent by scanner 530. The feedback notification may include the bit sequence, the feedback time (e.g., time interval between sending the response and receiving the feedback), etc. Processor 130 may store such feedback information for analyzing the intent of scanner 530.

After sending the first response to scanner 530 (step 816) or after receiving the first feedback from scanner 530 (step 818), method 800 may repeat the steps similar to steps 814, 816, and 818 with other network nodes, such as a second network node 730, a third network node 740, etc. Step 820 can be performed in a similar way to step 814, step 822 can be performed in a similar way to step 816, and step 824 can be performed in a similar way to step 818, only with respect to a different network node (e.g., network node 730 or 740). For example, when steps 820, 822, and 824 are performed with respect to network node 730, paths K, L, M, T, U, V, and Vi may correspond to paths H, I, J, Q, R, S, and Si, respectively. Similarly, when steps 820, 822, and 824 are performed with respect to network node 740, paths N, O, P, W, X, Y, and $Y_1$ may correspond to paths H, I, J, Q, R, S, and Si, respectively.

Figure 8C:
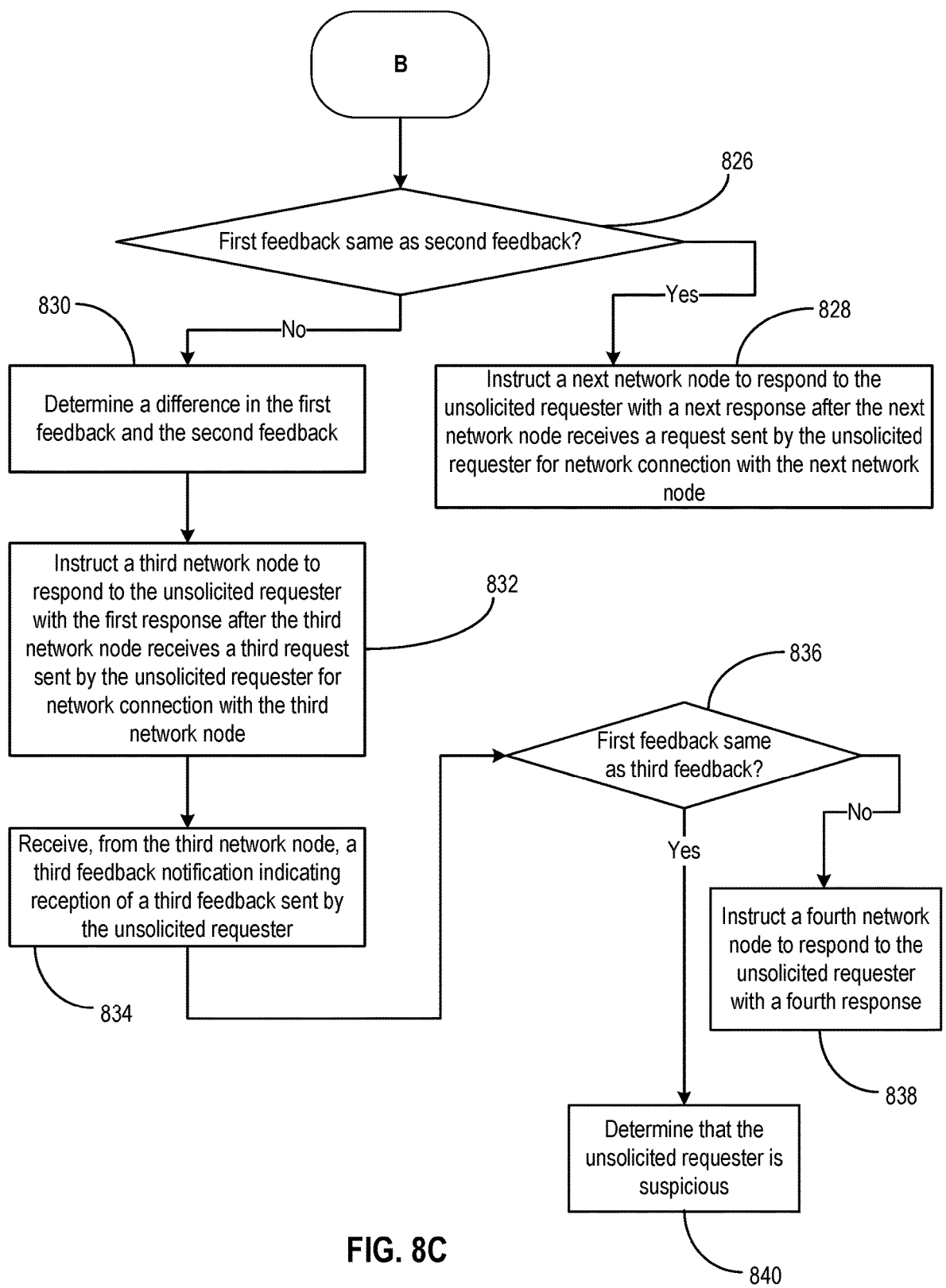

Referring to FIG. 8C, method 800 proceeds to step 826, in which processor 130 may compare feedback information received from two different network nodes. For example, referring to FIG. 7, processor 130 may compare feedback information received from path Si and feedback information received from path Vi to determine if there is a difference. The difference may include a difference in feedback bit sequence. For example, the length and/or content of the bit sequences received by network nodes 720 and 730 from scanner 530 may be different. The difference may also include a difference in feedback time. For example, scanner 530 may send the feedback to network node 720 50 ms after network node 720 responds to scanner 530, while scanner 530 may send the feedback to network node 730 80 ms after network node 730 responds to scanner 530. Because network nodes 720 and 730 send different responses (e.g., different service banners) to scanner 530, the difference in feedback may reveal preference or selectivity of scanner 530 with respect to different responses.

Returning to FIG. 8C, after processor 130 determines that there is no difference between the feedback information (e.g., the feedback received by two different network nodes are substantially the same), method 800 proceeds to step 828, in which processor 130 may cycle to a next network node (e.g., network node 740) in system 700 that receives a network connection request from scanner 530, including instructing the next network node to respond to the network connection request with a next response selected from the group of candidate responses. Step 828 may be implemented in a similar way to steps 814 and 816.

On the other hand, after processor 130 determines that there is a difference between the feedback information (e.g., the feedback received by two different network nodes are not the same), method 800 proceeds to step 830, in which processor 130 may determine the difference in the feedback. For example, processor 130 may determine the difference in length and/or content in the bit sequence. In another example, processor 130 may determine the difference in feedback time.

In step 832, processor 130 may instruct a third network node to respond to the unsolicited requester with the first response after the third network node receives a third request sent by the unsolicited requester for network connection with the third network node. For example, referring to FIG. 7, assume that network node 720 responds to scanner 530 with an Apache banner, and network node 730 responds to scanner 530 with an IIS banner, and that the feedback received by network nodes 720 and 730 are different, processor 130 may, after receiving notification that network node 740 receives a network connection request from scanner 530, instruct network node 740 to respond to scanner 530 with the Apache banner (same as network node 720) or the IIS banner (same as network node 730). Assume that processor 130 instructs network node 740 to response to scanner 530 with the Apache banner, and network node 740 receive the third feedback and notifies processor 130, as shown in step 834, processor 130 may then compare the feedback received by network nodes 720 and 740 to determine if the feedback are the same, in step 836. Alternatively or additionally, processor 130 may determine a first difference in feedback between network node 720 and one or more other network nodes. For example, processor 130 may determine that when the response is the Apache banner, the feedback includes a longer bit sequence than when the response is not the Apache banner. In another example, processor 130 may determine that when the response is the Apache banner, the feedback time is longer than when the response is not the Apache banner. Processor 130 may then determine a second difference in feedback between network node 740 and one or more other network nodes and determine if the first and second difference are the same. In other words, processor 130 may determine if scanner 530 behaves differently in the same way in response to a particular response compared to other responses. If so, method 800 proceeds to step 840, in which processor 130 may determine that scanner 530 is suspicious of targeting a particular type of server or service, and may flag scanner 530 in database 540. If not, method 800 proceeds to step 838, in which processor may instruct a fourth network node to response to scanner 530 with a fourth response, similar to step 828.

A further aspect of the disclosure is directed to a non-transitory computer-readable medium storing instructions which, when executed, cause one or more processors to perform the methods disclosed herein. The computer-readable medium may be volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

In some embodiments, a system for analyzing network traffic may include a plurality of network nodes distributed in multiple geographical regions. The plurality of network nodes may be configured to collect mass scanning network traffic data. The system may also include at least one processor configured to receive, from the plurality of network nodes, the collected mass scanning network traffic data. The processor may also be configured to generate an omnidirectional network traffic database based on the received mass scanning network traffic data. The processor may further be configured to receive a query against the omnidirectional network traffic database. The query may include information of a source of a network scanning activity. Moreover, the processor may be configured to determine whether the source matches any record in the omnidirectional network traffic database and generate an indication based on the determination.

In some embodiments, the indication may indicate that the network scanning activity is a targeted scanning activity when the source does not match any record in the omnidirectional network traffic database. The indication may indicate that the network scanning activity is not a targeted scanning activity when the source matches a record in the omnidirectional network traffic database.

In some embodiments, the plurality of network nodes may be located in datacenters of multiple cloud computing service providers.

In some embodiments, at least one of the plurality of network nodes may be configured to receive network traffic data via one or more network ports.

In some embodiments, the at least one of the plurality of network nodes may be configured to log the received network traffic data in a local directory.

In some embodiments, the at least one of the plurality of network nodes may include a log forwarder configured to send the logged network traffic data as part of the mass scanning network traffic data to a message queue.

In some embodiments, the at least one processor may be configured to subscribe to the message queue to receive the mass scanning network traffic data.

In some embodiments, the at least one processor may be configured to generate the omnidirectional network traffic database by augmenting the mass scanning network traffic data based on source information of the mass scanning network traffic data.

In some embodiments, the source information may include a network address of a scanner that initiates at least part of the mass scanning network traffic.

In some embodiments, the at least one processor may be configured to enrich the omnidirectional network traffic database by tagging records in the omnidirectional network traffic database based on a set of rules.

In some embodiments, the at least one processor may be configured to receive the query from a network security system of a user via an Application Programming Interface (API).

In some embodiments, the at least one processor may be configured to receive, from multiple users, multiple queries. Each query may include a respective network scanning activity from a same source. The at least one processor may also be configured to tag the source as suspicious of conducting micro-targeting network scans.

In some embodiments, a method for analyzing network traffic may include receiving, from a plurality of network nodes distributed in multiple geographical regions, mass scanning network traffic data collected by the plurality of network nodes. The method may also include generating an omnidirectional network traffic database based on the received mass scanning network traffic data. The method may further include receiving a query against the omnidirectional network traffic database. The query may include information of a source of a network scanning activity. In addition, the method may include determining whether the source matches any record in the omnidirectional network traffic database and generating an indication based on the determination.

In some embodiments, the indication may indicate that the network scanning activity is a targeted scanning activity when the source does not match any record in the omnidirectional network traffic database. The indication may indicate that the network scanning activity is not a targeted scanning activity when the source matches a record in the omnidirectional network traffic database.

In some embodiments, the plurality of network nodes may be located in datacenters of multiple cloud computing service providers.

In some embodiments, the method may include receiving network traffic data via one or more network ports of at least one of the plurality of network nodes.

In some embodiments, the method may include logging the received network traffic data in a local directory of the at least one of the plurality of network nodes.

In some embodiments, the method may include sending, by a log forwarder of the at least one of the plurality of network nodes, the logged network traffic data to a message queue as part of the mass scanning network traffic data.

In some embodiments, the method may include subscribing to the message queue to receive the mass scanning network traffic data.

In some embodiments, the method may include generating the omnidirectional network traffic database by augmenting the mass scanning network traffic data based on source information of the mass scanning network traffic data.

In some embodiments, the source information may include a network address of a scanner that initiates at least part of the mass scanning network traffic.

In some embodiments, the method may include enriching the omnidirectional network traffic database by tagging records in the omnidirectional network traffic database based on a set of rules.

In some embodiments, the method may include receiving the query from a network security system of a user via an Application Programming Interface (API).

In some embodiments, the method may include receiving, from multiple users, multiple queries. Each query may include a respective network scanning activity from a same source. The method may also include determining that the network scanning activities are targeted scanning activities and tagging the source as suspicious of conducting micro-targeting network scans.

In some embodiments, a non-transitory computer-readable medium may store instructions that, when executed by at least one processor, cause the at least one processor to perform a method for analyzing network traffic. The method may include receiving, from a plurality of network nodes distributed in multiple geographical regions, mass scanning network traffic data collected by the plurality of network nodes. The method may also include generating an omnidirectional network traffic database based on the received mass scanning network traffic data. The method may further include receiving a query against the omnidirectional network traffic database. The query may include information of a source of a network scanning activity. In addition, the method may include whether the source matches any record in the omnidirectional network traffic database and generating an indication based on the determination.

In some embodiments, a system for analyzing network traffic may include a memory storing computer-readable instructions and at least one processor in communication with the memory. The computer-readable instructions, when executed by the at least one processor, may cause the at least one processor to perform operations. The operations may include receiving, from a plurality of network listeners, network traffic data. The operations may also include aggregating the network traffic data to generate a database of mass scanning network traffic. The database may associate the mass scanning network traffic with respective sources of the mass scanning network traffic. The operations may further include querying the database with a first source associated with first network traffic. In addition, the operations may include determining whether at least one source in the database matches the first source.

In some embodiments, the operations may include deprioritizing the first network traffic after it is determined that at least one source in the database matches the first source.

In some embodiments, the operations may include enriching the database with contextual information based on a set of rules and providing the contextual information to a user after it is determined that at least one source in the database matches the first source.

In some embodiments, the contextual information may include at least one of temporal information of recording a source of mass scanning network traffic, a port number scanned by the source, an Autonomous System Number (ASN) associated with the source, geographical location information of the source, organizational information of the source, or a type of the source.

In some embodiments, the operations may include generating an indication indicating that the first network traffic is a targeted network traffic when no record in the database matches the first source.

In some embodiments, a method for analyzing network traffic may include receiving, from a plurality of network listeners, network traffic data. The method may also include aggregating the network traffic data to generate a database of mass scanning network traffic. The database may associate the mass scanning network traffic with respective sources of the mass scanning network traffic. The method may further include querying the database with a first source associated with first network traffic. In addition, the method may include determining whether at least one source in the database matches the first source.

In some embodiments, the method may include deprioritizing the first network traffic after it is determined that at least one source in the database matches the first source.

In some embodiments, the method may include enriching the database with contextual information based on a set of rules and providing the contextual information to a user after it is determined that at least one source in the database matches the first source.

In some embodiments, the contextual information may include at least one of temporal information of recording a source of mass scanning network traffic, a port number scanned by the source, an Autonomous System Number (ASN) associated with the source, geographical location information of the source, organizational information of the source, or a type of the source.

In some embodiments, the method may include generating an indication indicating that the first network traffic is a targeted network traffic when no record in the database matches the first source.

In some embodiments, a non-transitory computer-readable medium may store instructions that, when executed by at least one processor, cause the at least one processor to perform a method for analyzing network traffic. The method may include receiving, from a plurality of network listeners, network traffic data. The method may also include aggregating the network traffic data to generate a database of mass scanning network traffic. The database may associate the mass scanning network traffic with respective sources of the mass scanning network traffic. The method may further include querying the database with a first source associated with first network traffic. In addition, the method may include determining whether at least one source in the database matches the first source.

In some embodiments, a system for analyzing network traffic may include a plurality of network nodes distributed in multiple geographical regions. The plurality of network nodes may be configured to collect mass scanning network traffic data. The system may also include at least one processor. The processor may be configured to receive, from a first network node, a first network scanning request from a source scanner. In response to the reception of the first network scanning request, the processor may also be configured to transmit, via a second network node, a second network scanning request to the source scanner. The processor may further be configured to determine, based on feedback from the source scanner, whether the source scanner is compromised.

In some embodiments, the first network scanning request may include a first request to scan a first network port of the first network node having a first port number. The second network scanning request may include a second request to scan a second network port of the source scanner. The second network port may have a same port number as the first port number.

In some embodiments, the at least one processor may be configured to determine that the source scanner is compromised when the feedback from the source scanner indicates that the second network port is open.

In some embodiments, the first network scanning request may include a first request for a protocol through a first network port of the first network node having a first port number. The second network scanning request may include a second request for a same protocol through a second network port of the source scanner. The second network port may have a same port number as the first port number.

In some embodiments, the at least one processor may be configured to determine that the source scanner is compromised when the feedback from the source scanner indicates that the protocol is present at the second network port.

In some embodiments, the first network scanning request may include a first request for a file, service, or path from the first network node. The second network scanning request may include a second request for a same file, service, or path from the source scanner.

In some embodiments, the at least one processor may be configured to determine that the source scanner is compromised when the feedback from the source scanner indicates that the file, service, or path is present at the source scanner.

In some embodiments, the first and second network nodes may be located in different geographical regions.

In some embodiments, the first and second network nodes may be provided by different cloud computing service providers.

In some embodiments, a method for analyzing network traffic may include receiving, from a first network node, a first network scanning request from a source scanner. In response to the reception of the first network scanning request, the method may also include transmitting, via a second network node, a second network scanning request to the source scanner. The method may further include determining, based on feedback from the source scanner, whether the source scanner is compromised.

In some embodiments, the first network scanning request may include a first request to scan a first network port of the first network node having a first port number. The second network scanning request may include a second request to scan a second network port of the source scanner. The second network port may have a same port number as the first port number.

In some embodiments, the method may include determining that the source scanner is compromised when the feedback from the source scanner indicates that the second network port is open.

In some embodiments, the first network scanning request may include a first request for a protocol through a first network port of the first network node having a first port number. The second network scanning request may include a second request for a same protocol through a second network port of the source scanner. The second network port may have a same port number as the first port number.

In some embodiments, the method may include determining that the source scanner is compromised when the feedback from the source scanner indicates that the protocol is present at the second network port.

In some embodiments, the first network scanning request may include a first request for a file, service, or path from the first network node. The second network scanning request may include a second request for a same file, service, or path from the source scanner.

In some embodiments, the method may include determining that the source scanner is compromised when the feedback from the source scanner indicates that the file, service, or path is present at the source scanner.

In some embodiments, the first and second network nodes may be located in different geographical regions.

In some embodiments, the first and second network nodes may be provided by different cloud computing service providers.

In some embodiments, a non-transitory computer-readable medium may store instructions that, when executed by at least one processor, cause the at least one processor to perform a method for analyzing network traffic. The method may include receiving, from a first network node, a first network scanning request from a source scanner. In response to the reception of the first network scanning request, the method may include transmitting, via a second network node, a second network scanning request to the source scanner. The method may also include determining, based on feedback from the source scanner, whether the source scanner is compromised.

In some embodiments, a system for analyzing network traffic may include a memory storing computer-readable instructions and at least one processor in communication with the memory. The computer-readable instructions, when executed by the at least one processor, may cause the at least one processor to perform operations. The operations may include receiving, via a first network node, a first network inquiry. The operations may also include determining, based on the first network inquiry, a group of candidate responses. The group of candidate responses may be selected from a database storing network-wide historical responses to the first network inquiry. The operations may also include selecting a first response from the group of candidate responses. The operations may further include responding to the first network inquiry with the first response via the first network node.

In some embodiments, the operations may include receiving, via a second network node, a second network inquiry. The operations may also include determining that the second network inquiry has a same source as the first network inquiry. The operations may further include selecting a second response from the group of candidate responses. The second response may be different from the first response. Moreover, the operations may include responding to the second network inquiry with the second response via the second network node.

In some embodiments, the operations may include randomly selecting the first and second responses from the group.

In some embodiments, the operations may include sequentially selecting the first and second responses from the group according to a frequency of appearance in the database.

In some embodiments, the operations may include receiving multiple network inquiries from a same source as the first network inquiry via multiple other network nodes. The operations may also include selecting multiple responses from the group of candidate responses that are different from the first response. The multiple responses may be different from each other. The operations may further include responding to the multiple network inquiries with the multiple responses via the multiple other network nodes, respectively.

In some embodiments, the operations may include selecting the candidate responses in the group based on a number of occurrences of each candidate response in the database.

In some embodiments, the first network node may have a plurality of network ports.

Each port may be open to receive network inquiries.

In some embodiments, the first response may include a bit sequence.

In some embodiments, a method for analyzing network traffic may include receiving, via a first network node, a first network inquiry. The method may also include determining, based on the first network inquiry, a group of candidate responses. The group of candidate responses may be selected from a database storing network-wide historical responses to the first network inquiry. The method may further include selecting a first response from the group of candidate responses. Moreover, the method may include responding to the first network inquiry with the first response via the first network node.

In some embodiments, the method may include receiving, via a second network node, a second network inquiry. The method may also include determining that the second network inquiry has a same source as the first network inquiry. The method may further include selecting a second response from the group of candidate responses. The second response may be different from the first response. Moreover, the method may include responding to the second network inquiry with the second response via the second network node.

In some embodiments, the method may include randomly selecting the first and second responses from the group.

In some embodiments, the method may include sequentially selecting the first and second responses from the group according to a frequency of appearance in the database.

In some embodiments, the method may include receiving multiple network inquiries from a same source as the first network inquiry via multiple other network nodes. The method may also include selecting multiple responses from the group of candidate responses that are different from the first response. The multiple responses may be different from each other. Moreover, the method may include responding to the multiple network inquiries with the multiple responses via the multiple other network nodes, respectively.

In some embodiments, the method may include selecting the candidate responses in the group based on a number of occurrences of each candidate response in the database.

In some embodiments, the first network node may have a plurality of network ports.

Each port may be open to receive network inquiries.

In some embodiments, the first response may include a bit sequence.

In some embodiments, a non-transitory computer-readable medium may store instructions that, when executed by at least one processor, cause the at least one processor to perform a method for analyzing network traffic. The method may include receiving, via a first network node, a first network inquiry. The method may also include determining, based on the first network inquiry, a group of candidate responses. The group of candidate responses may be selected from a database storing network-wide historical responses to the first network inquiry. The method may further include selecting a first response from the group of candidate responses. Moreover, the method may include responding to the first network inquiry with the first response via the first network node.

In some embodiments, a system for analyzing network traffic may include a memory storing computer-readable instructions and at least one processor in communication with the memory. The computer-readable instructions, when executed by the at least one processor, may cause the at least one processor to perform operations. The operations may include receiving, from a first network node, a first notification indicating reception of a first request sent by an unsolicited requester for network connection with the first network node. The operations may also include instructing the first network node to respond to the first request with a first response. The operations may also include receiving, from a second network node, a second notification indicating reception of a second request sent by the unsolicited requester for network connection with the second network node. The operations may further include instructing the second network node to respond to the second request with a second response that is different from the first response.

In some embodiments, the operations may also include receiving, from a pilot network node, an initial notification indicating reception of an initial request sent by the unsolicited requester for network connection with the pilot network node. The operations may also include determining, based on the initial notification, connection information of the initial request. The operations may further include instructing the first and second network nodes to monitor network connection requests based on the connection information.

In some embodiments, the connection information may include a port to which the unsolicited requester requests to connect with the pilot network node. To instruct the first and second network nodes to monitor the network connection requests, the operations may include instructing the first and second network nodes to monitor the network connection requests at a same port.

In some embodiments, the connection information may include a protocol that the unsolicited requester uses in the initial request for network connection with the pilot network node. To instruct the first and second network nodes to monitor the network connection requests, the operations may include instructing the first and second network nodes to monitor the network connection requests using a same protocol.

In some embodiments, the operations may include receiving, from a pilot network node, an initial notification indicating reception of an initial request sent by the unsolicited requester for network connection with the pilot network node. The operations may also include determining, based on the initial notification, source information of the unsolicited requester. The operations may also include instructing the first and second network nodes to monitor network connection requests from the unsolicited requester based on the source information.

In some embodiments, the operations may include receiving, from a pilot network node, an initial notification indicating reception of an initial request sent by the unsolicited requester for network connection with the pilot network node. The operations may also include determining, based on the initial notification, a group of candidate responses. The group of candidate responses may include the first and second responses.

In some embodiments, the first or second response may include network service identification information.

In some embodiments, the operations may include receiving, from the first network node, a first feedback notification indicating reception of a first feedback sent by the unsolicited requester after the first network node responds to the first request with the first response. The operations may also include receiving, from the second network node, a second feedback notification indicating reception of a second feedback sent by the unsolicited requester after the second network node responds to the second request with the second response. The operations may also include determine a difference in the first feedback and the second feedback.

In some embodiments, the difference may include at least one of a difference in feedback bit sequence or a difference in feedback time.

In some embodiments, in response to the determination of the difference in the first feedback and the second feedback, the operations may include instructing a third network node to respond to the unsolicited requester with the first response after the third network node receives a third request sent by the unsolicited requester for network connection with the third network node. The operations may also include receiving, from the third network node, a third feedback notification indicating reception of a third feedback sent by the unsolicited requester after the third network node responds to the third request with the first response. The operations may also include determining that the unsolicited requester is suspicious when the third feedback is substantially the same as the first feedback.

In some embodiments, a method for analyzing network traffic may include receiving, from a first network node, a first notification indicating reception of a first request sent by an unsolicited requester for network connection with the first network node. The method may also include instructing the first network node to respond to the first request with a first response. The method may also include receiving, from a second network node, a second notification indicating reception of a second request sent by the unsolicited requester for network connection with the second network node. The method may further include instructing the second network node to respond to the second request with a second response that is different from the first response.

In some embodiments, the method may also include receiving, from a pilot network node, an initial notification indicating reception of an initial request sent by the unsolicited requester for network connection with the pilot network node. The method may also include determining, based on the initial notification, connection information of the initial request. The method may further include instructing the first and second network nodes to monitor network connection requests based on the connection information.

In some embodiments, the connection information may include a port to which the unsolicited requester requests to connect with the pilot network node. The step of instructing the first and second network nodes to monitor the network connection requests may include instructing the first and second network nodes to monitor the network connection requests at a same port.

In some embodiments, the connection information may include a protocol that the unsolicited requester uses in the initial request for network connection with the pilot network node. The step of instructing the first and second network nodes to monitor the network connection requests may include instructing the first and second network nodes to monitor the network connection requests using a same protocol.

In some embodiments, the method may include receiving, from a pilot network node, an initial notification indicating reception of an initial request sent by the unsolicited requester for network connection with the pilot network node. The method may also include determining, based on the initial notification, source information of the unsolicited requester. The method may further include instructing the first and second network nodes to monitor network connection requests from the unsolicited requester based on the source information.

In some embodiments, the method may include receiving, from a pilot network node, an initial notification indicating reception of an initial request sent by the unsolicited requester for network connection with the pilot network node. The method may also include determining, based on the initial notification, a group of candidate responses. The group of candidate responses may include the first and second responses.

In some embodiments, the method may include receiving, from the first network node, a first feedback notification indicating reception of a first feedback sent by the unsolicited requester after the first network node responds to the first request with the first response. The method may also include receiving, from the second network node, a second feedback notification indicating reception of a second feedback sent by the unsolicited requester after the second network node responds to the second request with the second response. The method may also include determine a difference in the first feedback and the second feedback.

In some embodiments, the difference may include at least one of a difference in feedback bit sequence or a difference in feedback time.

In some embodiments, in response to the determination of the difference in the first feedback and the second feedback, the method may include instructing a third network node to respond to the unsolicited requester with the first response after the third network node receives a third request sent by the unsolicited requester for network connection with the third network node. The method may also include receiving, from the third network node, a third feedback notification indicating reception of a third feedback sent by the unsolicited requester after the third network node responds to the third request with the first response. The method may also include determining that the unsolicited requester is suspicious when the third feedback is substantially the same as the first feedback.

In some embodiments, a non-transitory computer-readable medium may store instructions that, when executed by at least one processor, cause the at least one processor to perform a method for analyzing network traffic. The method may include receiving, from a first network node, a first notification indicating reception of a first request sent by an unsolicited requester for network connection with the first network node. The method may also include instructing the first network node to respond to the first request with a first response. The method may also include receiving, from a second network node, a second notification indicating reception of a second request sent by the unsolicited requester for network connection with the second network node. The method may further include instructing the second network node to respond to the second request with a second response that is different from the first response.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for analyzing network traffic, comprising:
a memory storing computer-readable instructions; and
at least one processor in communication with the memory, wherein the computer-readable instructions, when executed by the at least one processor, cause the at least one processor to perform operations comprising:
receiving, from a plurality of network listeners, network traffic data;
aggregating the network traffic data to generate a database of mass scanning network traffic, the database associating the mass scanning network traffic with respective sources of the mass scanning network traffic;
querying the database with a first source associated with first network traffic;
determining whether at least one source in the database matches the first source;
receiving, from multiple users, multiple queries, each comprising a respective network scanning activity from a same source;
determining that the network scanning activities are targeted scanning activities; and
tagging the source as suspicious of conducting micro-targeting network scans.

2. The system of claim 1, wherein the operations comprise:
deprioritizing the first network traffic after it is determined that at least one source in the database matches the first source.

3. The system of claim 1, wherein the operations comprise:
enriching the database with contextual information based on a set of rules; and providing the contextual information to a user after it is determined that at least one source in the database matches the first source.

4. The system of claim 3, wherein the contextual information comprises at least one of temporal information of recording a source of mass scanning network traffic, a port number scanned by the source, an Autonomous System Number (ASN) associated with the source, geographical location information of the source, organizational information of the source, or a type of the source.

5. The system of claim 1, wherein the operations comprise:
generating an indication indicating that the first network traffic is a targeted network traffic when no record in the database matches the first source.

6. The system of claim 1, wherein the plurality of network listeners are located in datacenters of multiple cloud computing service providers.

7. The system of claim 1, wherein the operations comprise:
enriching the database by tagging records in the database based on a set of rules.

8. The system of claim 1, wherein the operations comprise:
receiving a query from a network security system of a user via an Application Programming Interface (API).

9. A method for analyzing network traffic, comprising:
receiving, from a plurality of network listeners, network traffic data;
aggregating the network traffic data to generate a database of mass scanning network traffic, the database associating the mass scanning network traffic with respective sources of the mass scanning network traffic;
querying the database with a first source associated with first network traffic;
determining whether at least one source in the database matches the first source;
receiving, from multiple users, multiple queries, each comprising a respective network scanning activity from a same source;
determining that the network scanning activities are targeted scanning activities; and
tagging the source as suspicious of conducting micro-targeting network scans.

10. The method of claim 9, comprising:
deprioritizing the first network traffic after it is determined that at least one source in the database matches the first source.

11. The method of claim 9, comprising:
enriching the database with contextual information based on a set of rules; and
providing the contextual information to a user after it is determined that at least one source in the database matches the first source.

12. The method of claim 11, wherein the contextual information comprises at least one of temporal information of recording a source of mass scanning network traffic, a port number scanned by the source, an Autonomous System Number (ASN) associated with the source, geographical location information of the source, organizational information of the source, or a type of the source.

13. The method of claim 9, comprising:
generating an indication indicating that the first network traffic is a targeted network traffic when no record in the database matches the first source.

14. The method of claim 9, wherein the plurality of network listeners are located in datacenters of multiple cloud computing service providers.

15. The method of claim 9, comprising:
enriching the database by tagging records in the database based on a set of rules.

16. The method of claim 9, comprising:
receiving a query from a network security system of a user via an Application Programming Interface (API).

17. A non-transitory computer-readable medium storing instructions that, when executed by at least one processor, cause the at least one processor to perform a method for analyzing network traffic, the method comprising:
receiving, from a plurality of network listeners, network traffic data;
aggregating the network traffic data to generate a database of mass scanning network traffic, the database associating the mass scanning network traffic with respective sources of the mass scanning network traffic;
querying the database with a first source associated with first network traffic;
determining whether at least one source in the database matches the first source;
receiving, from multiple users, multiple queries, each comprising a respective network scanning activity from a same source;
determining that the network scanning activities are targeted scanning activities; and
tagging the source as suspicious of conducting micro-targeting network scans.

18. The non-transitory computer-readable medium of claim 17, wherein the method comprises:
deprioritizing the first network traffic after it is determined that at least one source in the database matches the first source.

* * * * *